US012232499B2

(12) United States Patent
Deschner

(10) Patent No.: US 12,232,499 B2
(45) Date of Patent: Feb. 25, 2025

(54) INDUSTRIAL PAN GREASING SYSTEM

(71) Applicant: Synova, LLC, Urbana, OH (US)

(72) Inventor: Philip Deschner, Fort Loramie, OH (US)

( * ) Notice: Subject to any disclaimer, the term of this patent is extended or adjusted under 35 U.S.C. 154(b) by 475 days.

(21) Appl. No.: 17/862,743

(22) Filed: Jul. 12, 2022

(65) Prior Publication Data

US 2024/0016162 A1 Jan. 18, 2024

(51) Int. Cl.
*A21B 3/16* (2006.01)
*B05B 1/16* (2006.01)
*B05B 1/20* (2006.01)
*B05B 7/24* (2006.01)
*B05B 7/26* (2006.01)

(52) U.S. Cl.
CPC .............. *A21B 3/16* (2013.01); *B05B 1/1609* (2013.01); *B05B 1/20* (2013.01); *B05B 7/2486* (2013.01); *B05B 7/265* (2013.01)

(58) Field of Classification Search
CPC ........... A21B 3/16; B05B 1/1609; B05B 1/20; B05B 7/2486; B05B 7/265
USPC .................................. 239/550, 551, 566, 583
See application file for complete search history.

(56) References Cited

U.S. PATENT DOCUMENTS

| | | | | | |
|---|---|---|---|---|---|
| 2,633,820 | A | * | 4/1953 | Koerber | A21B 3/16 118/685 |
| 2,892,438 | A | * | 6/1959 | Hery | B05B 16/95 118/682 |
| 3,077,857 | A | * | 2/1963 | Widner | B05B 12/122 239/456 |
| 3,250,247 | A | * | 5/1966 | Beaman | B60T 13/12 239/453 |
| 5,531,832 | A | * | 7/1996 | McCalip | B05B 5/001 118/685 |

* cited by examiner

*Primary Examiner* — Steven J Ganey

(57) ABSTRACT

A greasing system comprising a lubricant; pressurized air; a spray nozzle assembly in communication with the lubricant and the pressurized air having a spray nozzle manifold that further includes a valve bar assembly having a lubricant reservoir in communication with the lubricant; a plurality of proportional solenoid valves in communication with the lubricant reservoir; a plurality of lubricant passages in communication with the proportional solenoid valves; a plurality air passages in communication with the source of pressurized air; and a plurality of valves positioned in-line between the pressurized air and each air passage; and a nozzle bar assembly detachably connected to the valve bar assembly that further includes lubricant passages in communication with the lubricant passages in the valve bar assembly; air passages in communication with the air passages in the valve bar assembly; chambers in communication with corresponding lubricant passages in the nozzle bar assembly and corresponding air passages in the nozzle bar assembly, wherein lubricant is deposited in each chamber through the lubricant passage; and a spray nozzle in communication with each chamber, wherein the pressurized air is used to propel droplets of lubricant from the nozzle.

20 Claims, 28 Drawing Sheets

INDUSTRIAL PAN GREASING SYSTEM

BACKGROUND

The disclosed inventive subject matter relates in general to industrial or commercial baking systems, devices, and methods and more specifically to an industrial greasing system for use with baking pans and the like.

Pan lubrication is an important aspect of high-speed baking processes that generate thousands of loaves of cake or other baked items per hour. Pan lubrication permits baked goods to be easily de-panned (i.e., released from pan) as soon as the baked goods are removed from an oven. During the pan lubrication process, an edible grease is typically sprayed through a plurality of nozzles onto the inside walls of a baking pan prior to batter being deposited into the pan from a batter depositor. Spray nozzles may be arranged in hygienically designed manifolds for a variety of conveyor widths and pan designs. Pan lubrication processes are usually accomplished using automated mechanical pan greasing systems.

Pan greasers are typically adjusted to deliver a preset amount of lubricant to the inside surfaces of baking pans in a short period of time, determined largely by pan conveyor speed. Intermittent spraying reduces grease waste and minimizes line cleanup. Pan lubrication equipment should consistently spray a predetermined volume of lubricant, subject to normal and permissible deviations between oil applications. The phenomenon of misting that may occur during an oil coating process is undesirable because it results in lubricant waste and poor oil distribution. Spray nozzles should be regularly serviced and cleaned according to established maintenance and cleaning protocols. Poorly maintained nozzles will clog and become a contamination source for baked products.

Quality control and quality assurance procedures should consistently be followed to assure that pan greasing systems are operating properly and within product specifications, as the negative consequences of improperly lubricated pans can be considerable. The results of pan over-lubrication include: (a) accumulation of excess oil in the bottom of the pans; (b) the appearance of spots or stains on the crust of pan-baked products; (c) excessive and unnecessary use of lubricant; (d) over-baked product sidewalls; and (e) increased time required to clean baking pans and baking systems. The results of pan under-lubrication include: (a) baked product crust sticking to the interior surfaces of baking pans; (b) generation of waste during de-panning because damaged baked products cannot be reworked; and (c) under-baked product sidewalls. Accordingly, there is an ongoing need for an industrial baking system and device that lubricates baking pans in a precise and consistent manner, avoids the generation of lubricant mist; and that permits fast and easy cleaning and servicing of system assemblies, particularly the spray nozzles.

SUMMARY

The following provides a summary of certain example implementations of the disclosed inventive subject matter. This summary is not an extensive overview and is not intended to identify key or critical aspects or elements of the disclosed inventive subject matter or to delineate its scope. However, it is to be understood that the use of indefinite articles in the language used to describe and claim the disclosed inventive subject matter is not intended in any way to limit the described inventive subject matter. Rather the use of "a" or "an" should be interpreted to mean "at least one" or "one or more".

A first example implementation of the disclosed technology provides a greasing system comprising a source of lubricant; a source of pressurized air; a spray nozzle assembly in communication with the source of lubricant and the source of pressurized air, wherein the spray nozzle assembly includes a spray nozzle manifold, and wherein the spray nozzle manifold further includes a valve bar assembly, wherein the valve bar assembly further includes a lubricant reservoir in fluid communication with the source of lubricant; a plurality of proportional solenoid valves in fluid communication with the lubricant reservoir; a plurality of lubricant passages in fluid communication with the plurality of proportional solenoid valves; a plurality air passages in communication with the source of pressurized air; and a plurality of valves positioned in-line between the source of pressurized air and each air passage in the plurality air passages; and a nozzle bar assembly detachably connected to the valve bar assembly, wherein the nozzle bar assembly is specific to a predetermined style of pan, and wherein the nozzle bar assembly further includes a plurality of lubricant passages in fluid communication with the plurality of lubricant passages in the valve bar assembly; a plurality of air passages in communication with the a plurality of air passages in the valve bar assembly; a plurality of chambers, wherein each chamber in the plurality of chambers is in communication with a corresponding lubricant passage in the nozzle bar assembly and a corresponding air passage in the nozzle bar assembly, and wherein a predetermined volume of lubricant is deposited in each chamber through the lubricant passage; and a spray nozzle in communication with each chamber, wherein the pressurized air propels the lubricant from the spray nozzle in the form of droplets.

The lubricant may include edible grease. The spray nozzle assembly may further include a mist collecting device. The spray nozzle assembly may further include an enclosure having a lid which may be opened and closed. The system may further comprise a supportive frame on which the source of lubricant, source of pressurized air, and spray nozzle assembly are mounted. The supportive frame may further include a gantry arm on which the spray nozzle assembly is mounted. The system may further comprise a seal disposed between the valve bar assembly and the nozzle bar assembly. The system may further comprise an air manifold assembly. The system may further comprise a controller for providing operational commands to the spray nozzle assembly. The plurality of proportional solenoid valves may include up to 40 individual solenoid valves. Each solenoid valve in the plurality of proportional solenoid valves may be adjustable, removable, and replaceable independent of the other solenoid valves.

A second example implementation of the disclosed technology provides a pan greasing system comprising a source of lubricant; a source of pressurized air; a spray nozzle assembly in communication with the source of lubricant and the source of pressurized air, wherein the spray nozzle assembly includes a spray nozzle manifold, and wherein the spray nozzle manifold further includes a valve bar assembly, wherein the valve bar assembly further includes a lubricant reservoir in fluid communication with the source of lubricant; a plurality of proportional solenoid valves in fluid communication with the lubricant reservoir; a plurality of lubricant passages in fluid communication with the plurality of proportional solenoid valves; a plurality air passages in communication with the source of pressurized air; and a plurality of valves positioned in-line between the source of pressurized air and each air passage in the plurality air passages; and a nozzle bar assembly detachably connected to the valve bar assembly, wherein the nozzle bar assembly is specific to a predetermined style of pan, and wherein the nozzle bar assembly further includes a plurality of lubricant passages in fluid communication with the plurality of lubricant passages in the valve bar assembly; a plurality of air passages in communication with the a plurality of air passages in the valve bar assembly; a plurality of chambers, wherein each chamber in the plurality of chambers is in communication with a corresponding lubricant passage in the nozzle assembly and a corresponding air passage in the nozzle bar assembly, and wherein a predetermined volume of lubricant is deposited in each chamber through the lubricant passage; and a spray nozzle in communication with each chamber, wherein the pressurized air propels the lubricant from the spray nozzle in the form of droplets; and a seal disposed between the valve bar assembly and the nozzle bar assembly; and an enclosure for housing the spray nozzle assembly, wherein the enclosure includes a lid which may be opened and closed.

The spray nozzle assembly may further include a mist collecting device. The system may further comprise a supportive frame on which the source of lubricant and source of pressurized air are mounted, wherein the supportive frame further includes a gantry arm on which the spray nozzle assembly and enclosure are mounted. The system may further comprise an air manifold assembly. The system may further comprise a controller for providing operational commands to the spray nozzle assembly. The plurality of proportional solenoid valves may include up to 40 individual solenoid valves. Each solenoid valve in the plurality of proportional solenoid valves may be adjustable, removable, and replaceable independent of the other solenoid valves.

A third example implementation of the disclosed technology provides an industrial pan greasing system comprising a source of lubricant; a source of pressurized air; a spray nozzle assembly in fluid communication with the source of lubricant and the source of pressurized air, wherein the spray nozzle assembly includes a spray nozzle manifold, and wherein the spray nozzle manifold further includes a valve bar assembly, wherein the valve bar assembly further includes a lubricant reservoir in fluid communication with the source of lubricant; a plurality of proportional solenoid valves in fluid communication with the lubricant reservoir; a plurality of lubricant passages in fluid communication with the plurality of proportional solenoid valves; a plurality air passages in communication with the source of pressurized air; and a plurality of valves positioned in-line between the source of pressurized air and each air passage in the plurality air passages; and a nozzle bar assembly detachably connected to the valve bar assembly, wherein the nozzle bar assembly is specific to a predetermined style of pan, and wherein the nozzle bar assembly further includes a plurality of lubricant passages in fluid communication with the plurality of lubricant passages in the valve bar assembly; a plurality of air passages in communication with the a plurality of air passages in the valve bar assembly; a plurality of chambers, wherein each chamber in the plurality of chambers is in communication with a corresponding lubricant passage in the nozzle bar assembly and a corresponding air passage in the nozzle bar assembly, and wherein a predetermined volume of lubricant is deposited in each chamber through the lubricant passage; and a spray nozzle in communication with each chamber, wherein the pressurized air propels the lubricant from the spray nozzle in the form of droplets; and a seal disposed between the valve bar assembly and the nozzle bar assembly; and an enclosure for housing the spray nozzle assembly, wherein the enclosure includes a lid which may be opened and closed, and wherein an air manifold assembly mounted within the enclosure; a controller for providing operational commands to the spray nozzle assembly; and a supportive frame on which the source of lubricant, source of pressurized air, and controller are mounted.

The supportive frame may further include a gantry arm on which the spray nozzle assembly and enclosure are mounted. The plurality of proportional solenoid valves may include up to 40 individual solenoid valves, wherein each solenoid valve in the plurality of proportional solenoid valves is adjustable, removable, and replaceable independent of the other solenoid valves.

It should be appreciated that all combinations of the foregoing concepts and additional concepts discussed in greater detail below (provided such concepts are not mutually inconsistent) are contemplated as being part of the inventive subject matter disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed inventive subject matter and, together with the general description given above and detailed description given below, serve to explain the principles of the disclosed subject matter, and wherein.

DETAILED DESCRIPTION

Figure 1:
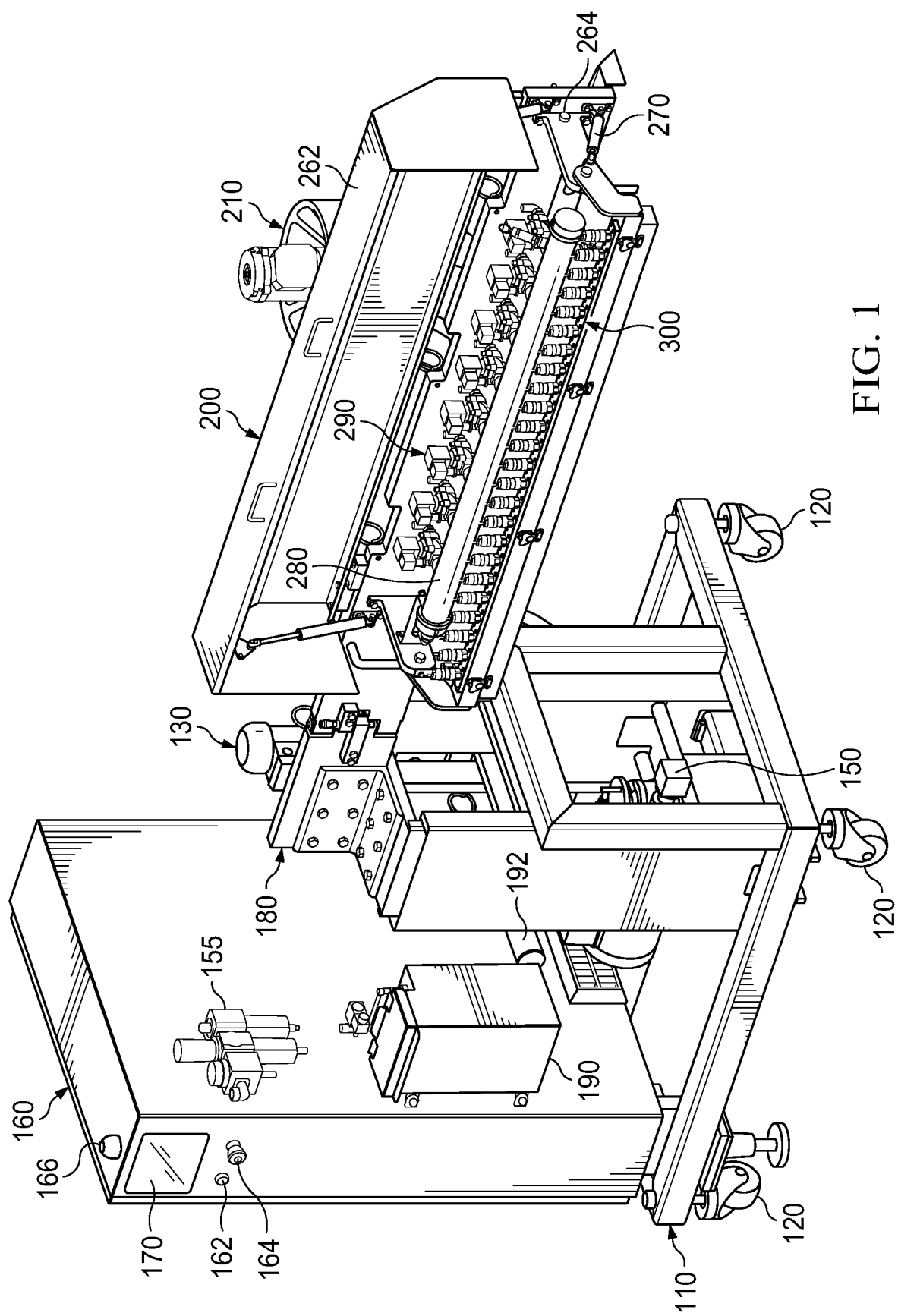
FIG. 1 is a front perspective view of an example implementation of the disclosed industrial baking pan greasing system.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed inventive subject matter. Accordingly, the following implementations are set forth without any loss of generality to, and without imposing limitations upon, the claimed subject matter. The disclosed inventive subject matter relates in general to industrial or commercial baking systems, devices, and methods and more specifically to an industrial greasing system for use with baking pans and the like. The exemplary greater shown in the Figures and described herein is "cantilevered unit" for use with a 1200 mm wide Auto-Bake system (see: https://www.auto-bake-.com/). However, other widths of Autobake systems exit and alternate implementations of the disclosed system, such as a "conveyorized unit" can be used in standard pan systems.

Figure 2:
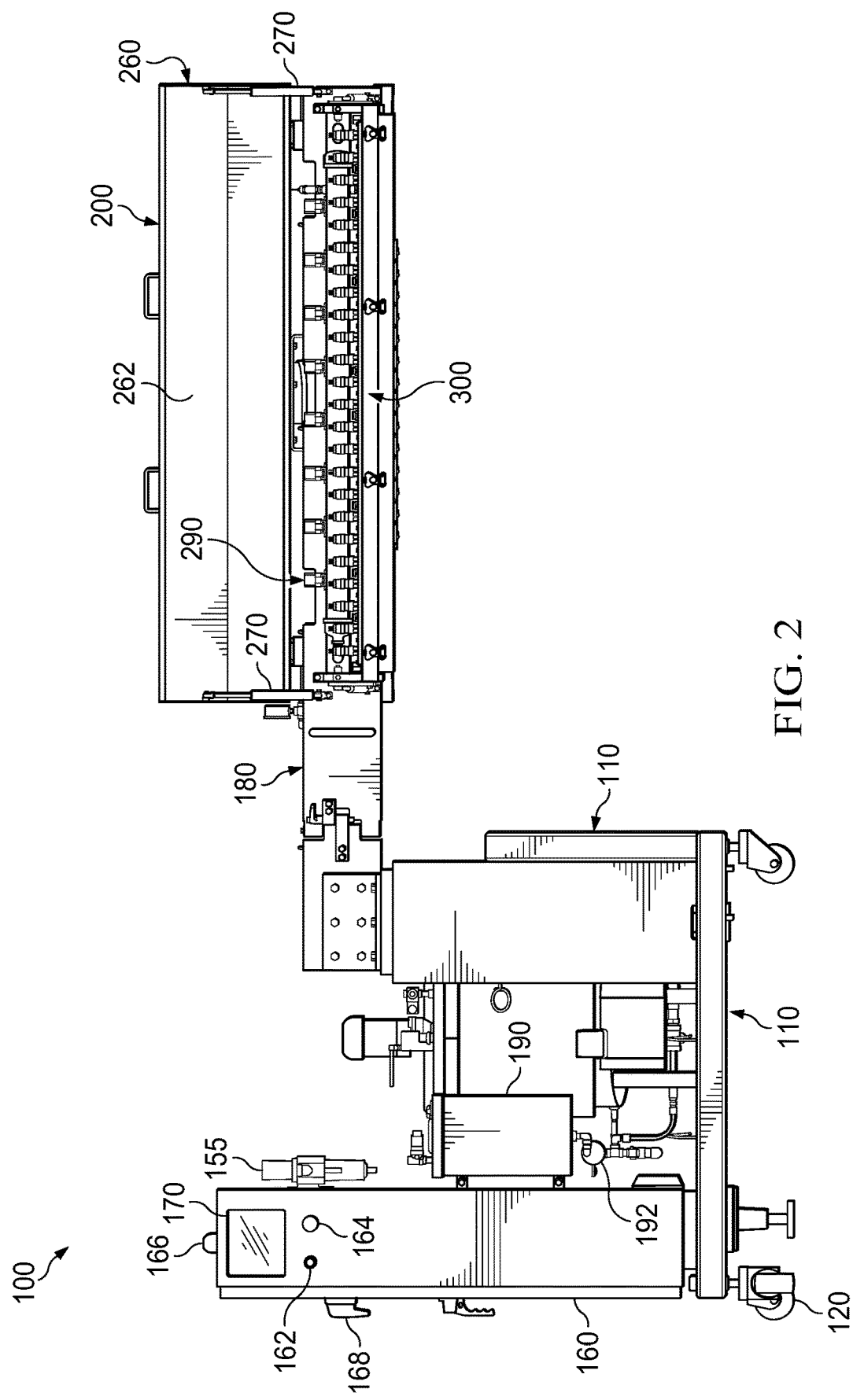
FIG. 2 is a front view of the industrial baking pan greasing system of FIG. 1.
Figure 3:
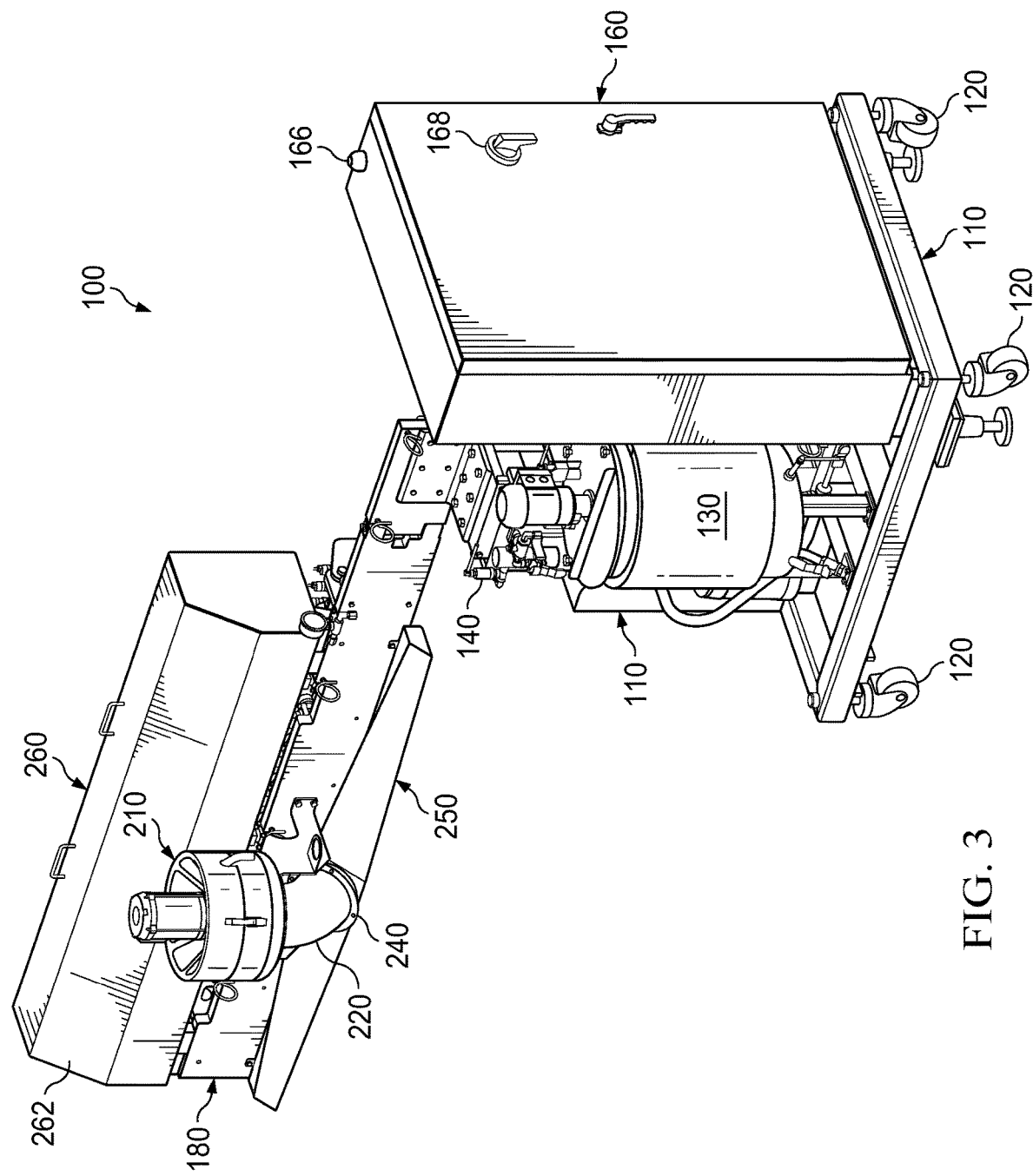
FIG. 3 is a rear view of the industrial baking pan greasing system of FIG. 1.
Figure 4:
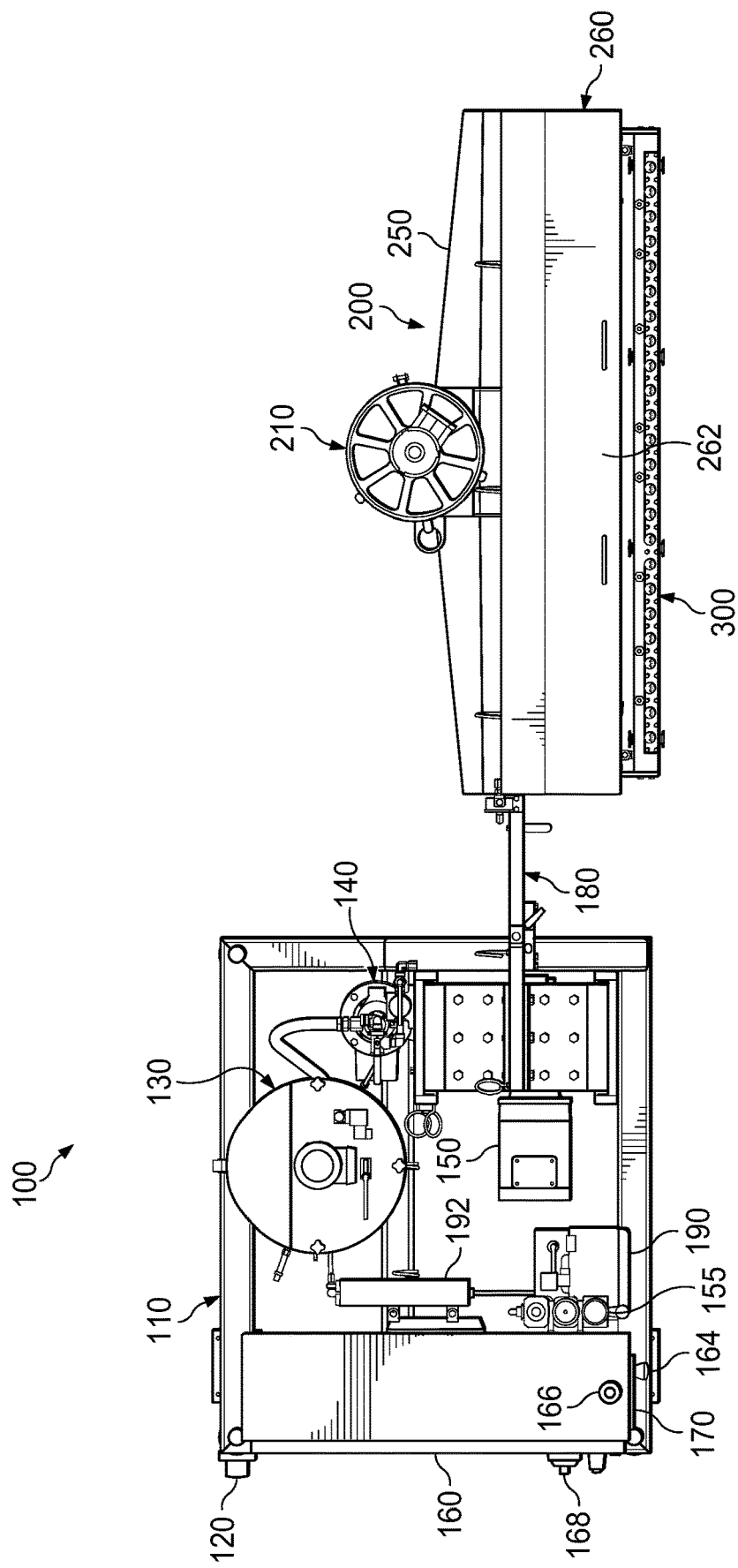
FIG. 4 is a top view of the industrial baking pan greasing system of FIG. 1.
Figure 5:
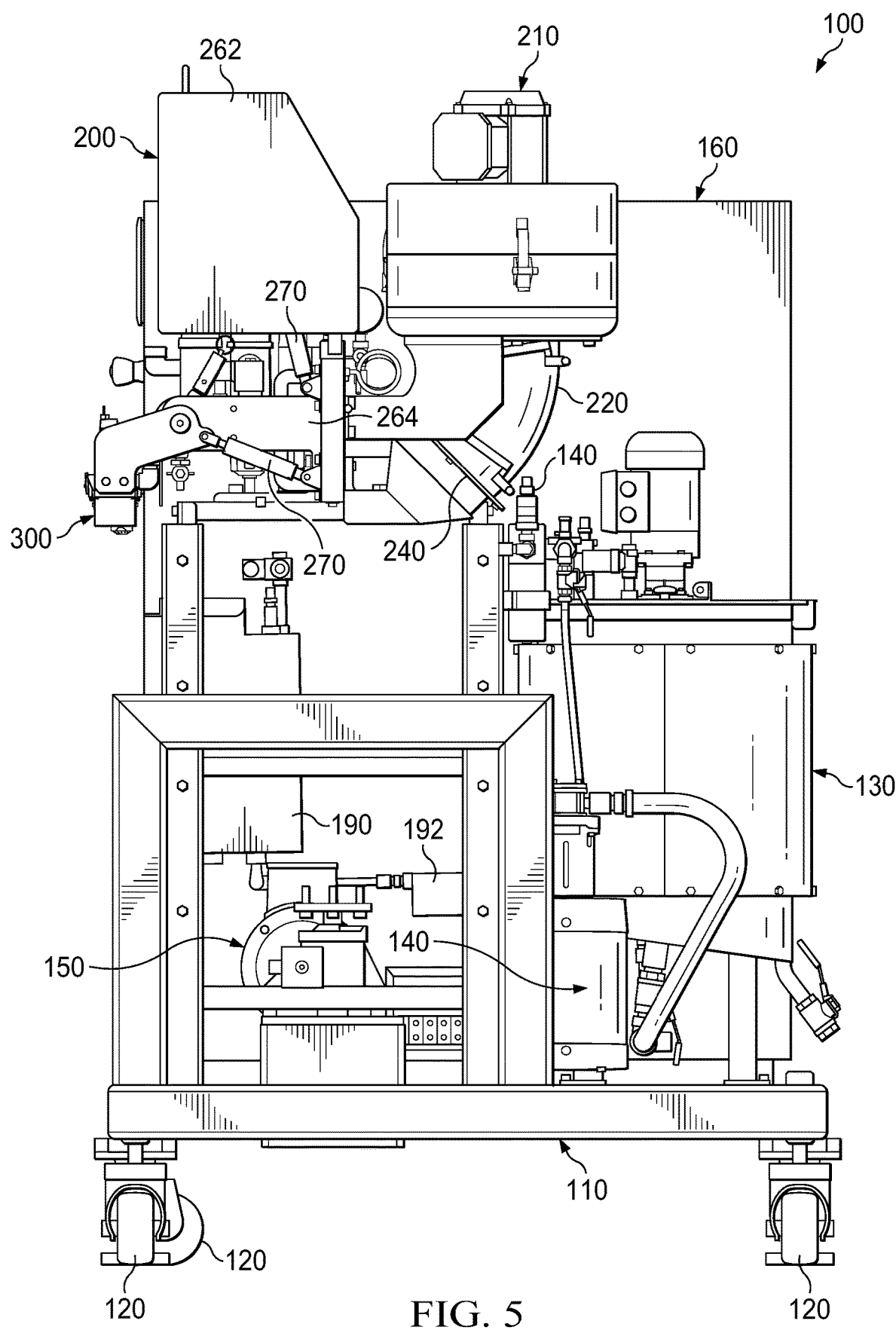
FIG. 5 is a right side view of the industrial baking pan greasing system of FIG. 1.

FIG. 1 provides a front perspective view of an example implementation of the disclosed industrial baking pan greasing system; FIG. 2 provides a front view of the industrial baking pan greasing system of FIG. 1; FIG. 3 provides a rear view of the industrial baking pan greasing system of FIG. 1;

FIG. 4 provides a top view of the industrial baking pan greasing system of FIG. 1; and FIG. 5 provides a right side view of the industrial baking pan greasing system of FIG. 1. With reference to FIGS. 1-5, pan greasing system 100 includes supportive frame 110 which sits on a series of casters 120; hopper tank 130 which stores lubricant and which contains an agitator for maintaining homogeneity and uniform heating of the lubricant; grease plumbing circuitry 140 through which the lubricant is distributed; lift assembly 150; pneumatic assembly 155 for providing pressurized air to valves 290; controller enclosure 160 which houses electrical circuitry for controlling the system; gantry arm 180 upon which spray nozzle assembly 200 is mounted; purge oil reservoir 190; and purge oil heater 192. Purge oil reservoir 190; and purge oil heater 192 are optional items that are commercially available and that may be included in the disclosed system for purging grease out of the system using a predetermined type of mineral oil to prevent the grease from solidifying and clogging the valves. Controller enclosure 160 also includes "cycle start" push button operator 162; emergency stop 164; indicator signal light 166; electrical disconnect switch 168; and operator panel view 170. In addition to the implementation of pan greasing system 100 shown in the Figures which includes 24 nozzles, other implementations include spray nozzle assemblies of different sizes typically ranging from 15-40 nozzles with other sizes and configurations being possible.

Figure 6:
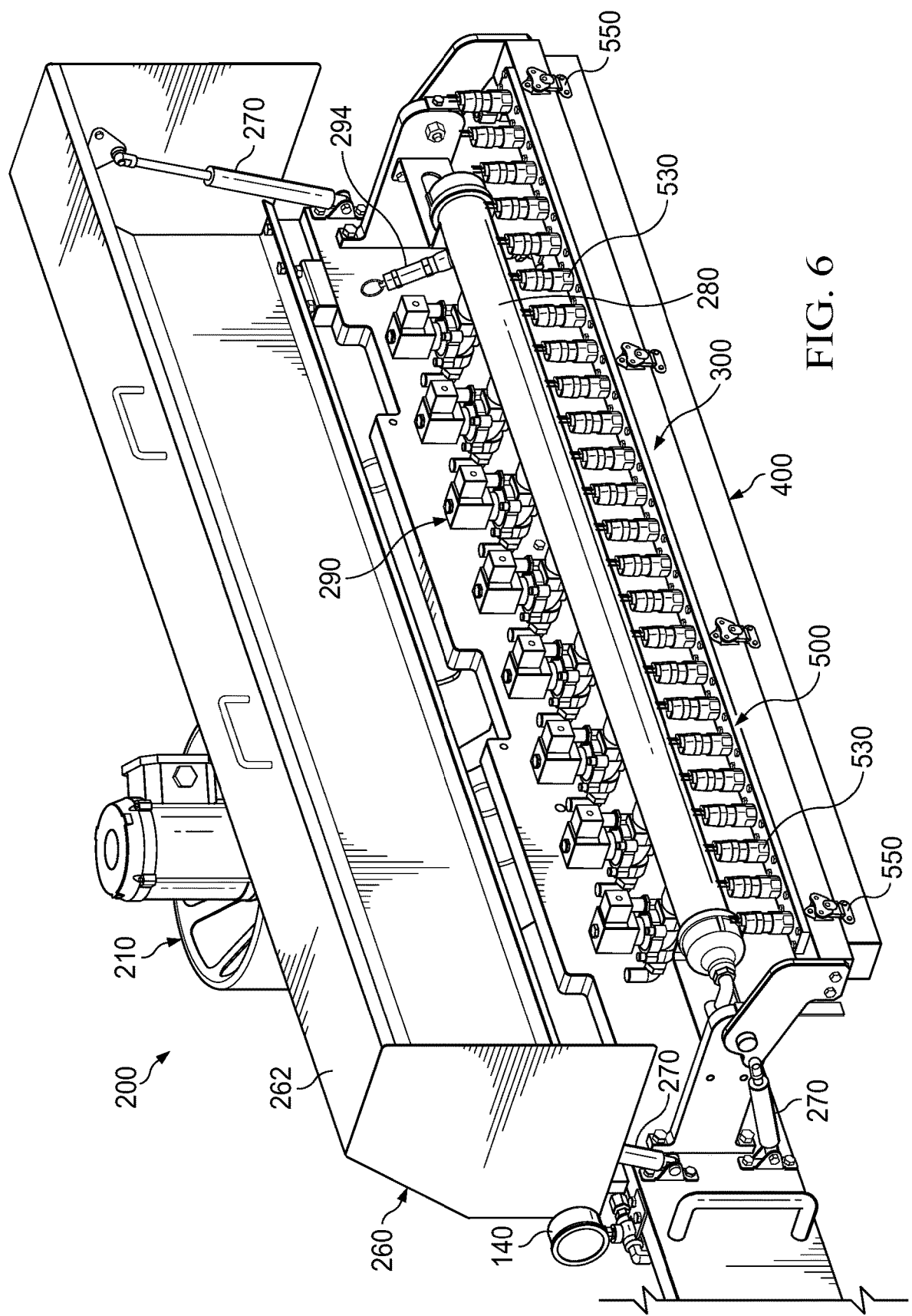
FIG. 6 is a left perspective view of an example implementation of a spray nozzle assembly included in the disclosed industrial baking pan greasing system.
Figure 7:
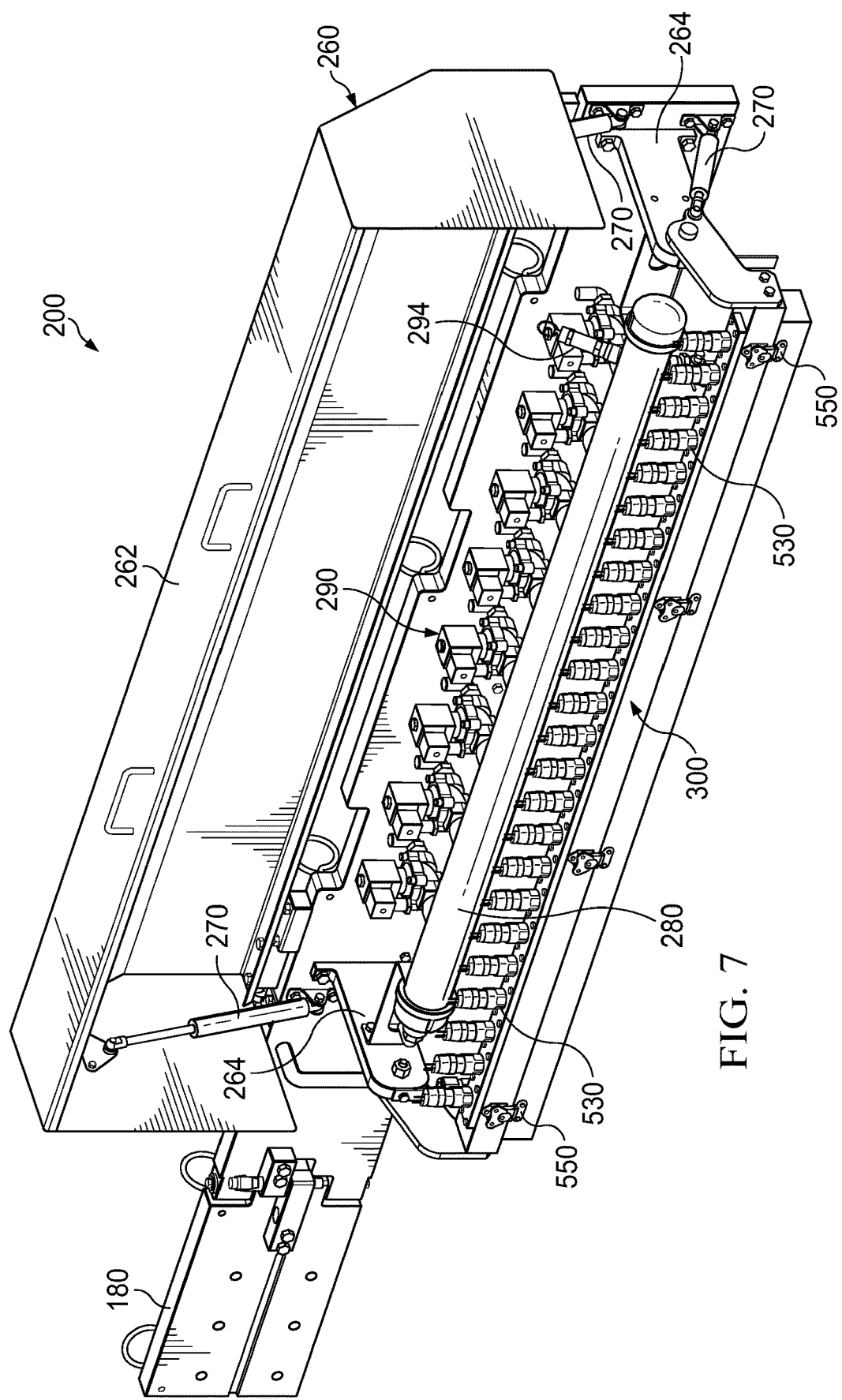
FIG. 7 is a right perspective view of the spray nozzle assembly of FIG. 6.
Figure 8:
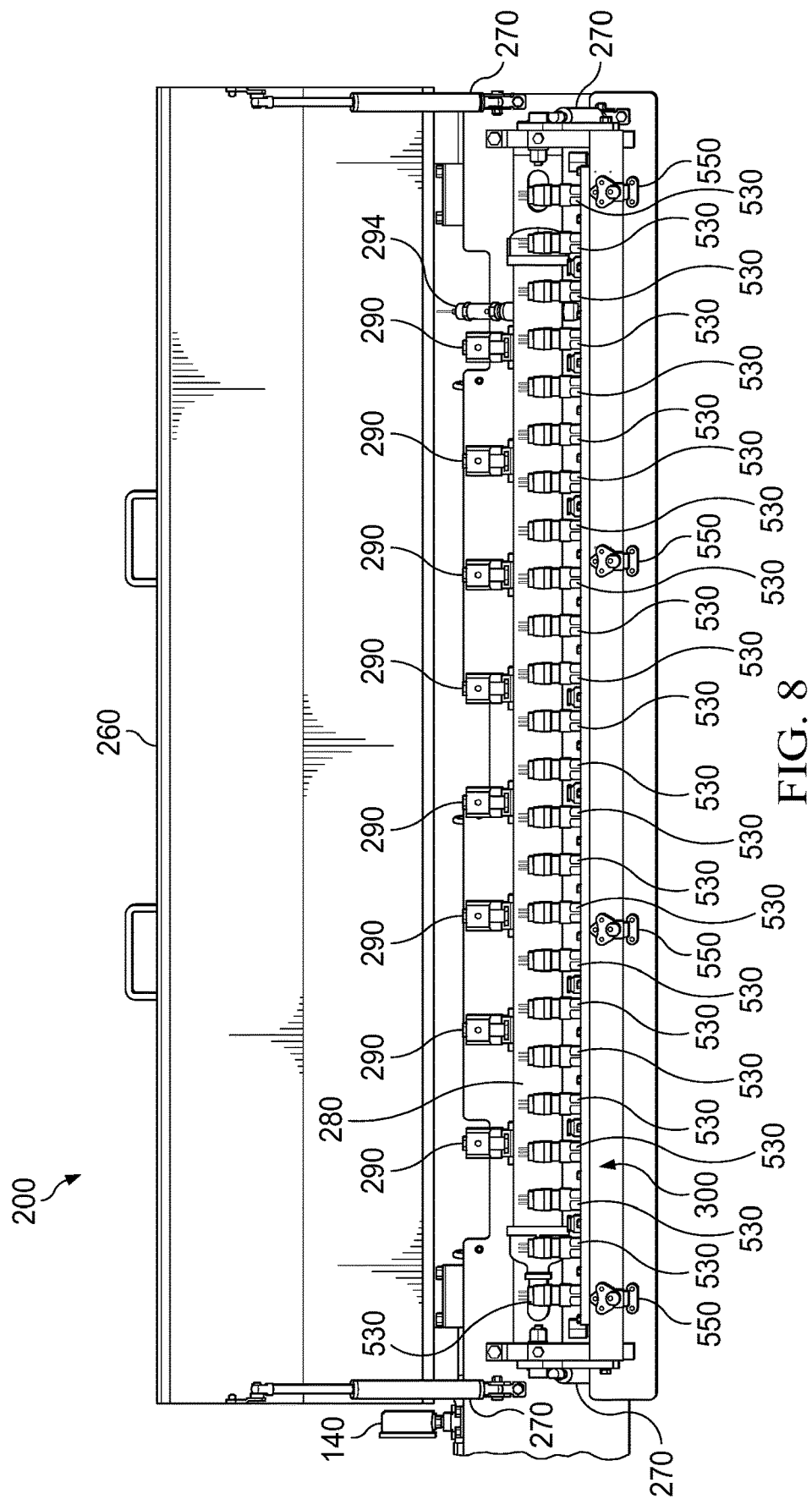
FIG. 8 is a front view of the spray nozzle assembly of FIG. 6.
Figure 9:
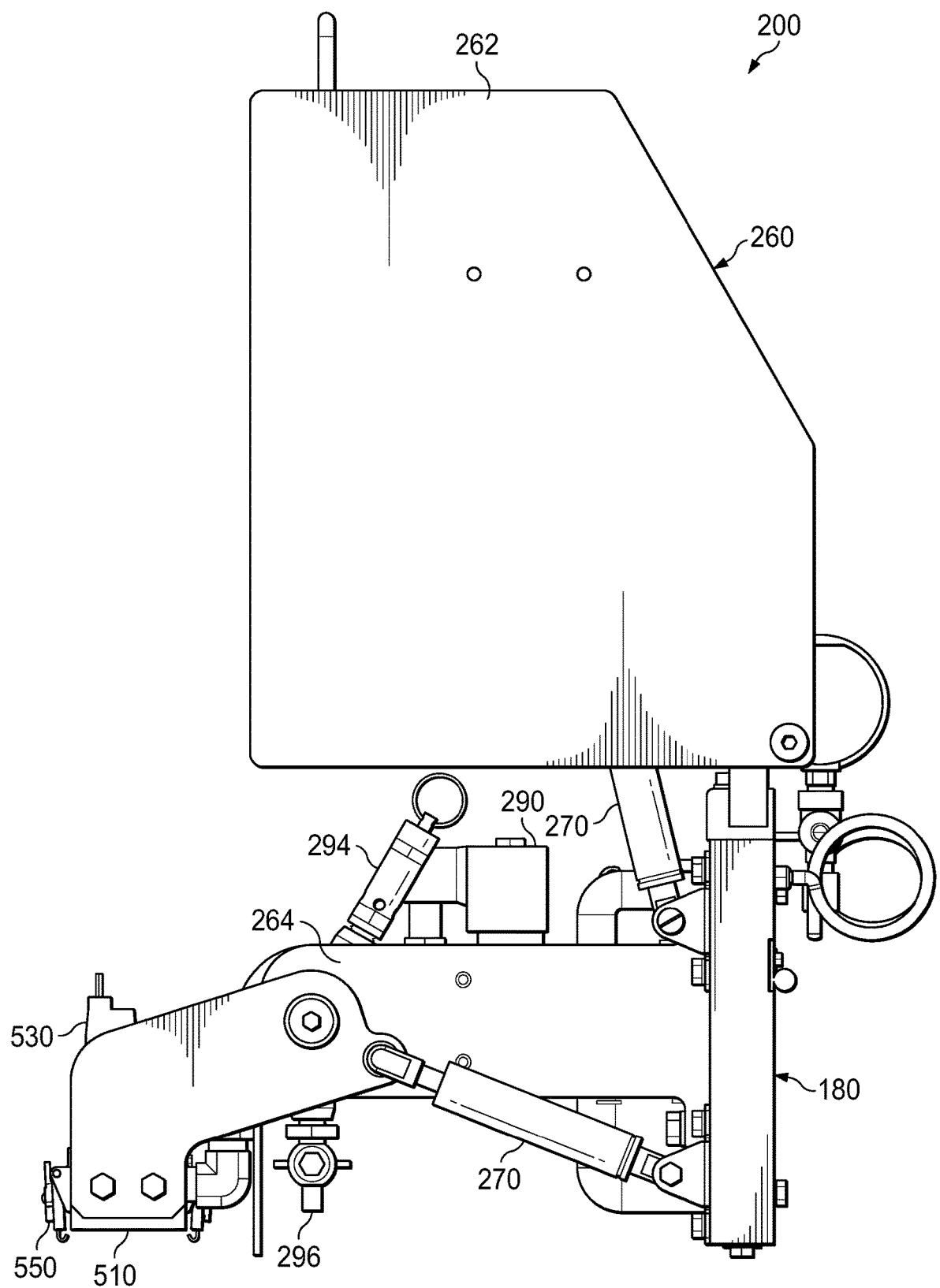
FIG. 9 is a side view of the spray nozzle assembly of FIG. 6.

FIG. 6 provides a left perspective view of an example implementation of a spray nozzle assembly compatible with the disclosed industrial baking pan greasing system; FIG. 7 provides a right perspective view of the spray nozzle assembly of FIG. 6; FIG. 8 provides a front view of the spray nozzle assembly of FIG. 6; and FIG. 9 provides a side view of the spray nozzle assembly of FIG. 6. With reference to FIGS. 3 and 6-9, spray nozzle assembly 200 includes; mist collector 210; flex hose 220; diffuser plate 240; mist collection hood 250; enclosure 260, which includes enclosure lid 262 and enclosure base 264; gas springs 270; air manifold assembly 280; air manifold assembly valves 290; air pressure relief valve 294; and air drain valve 296.

Figure 10:
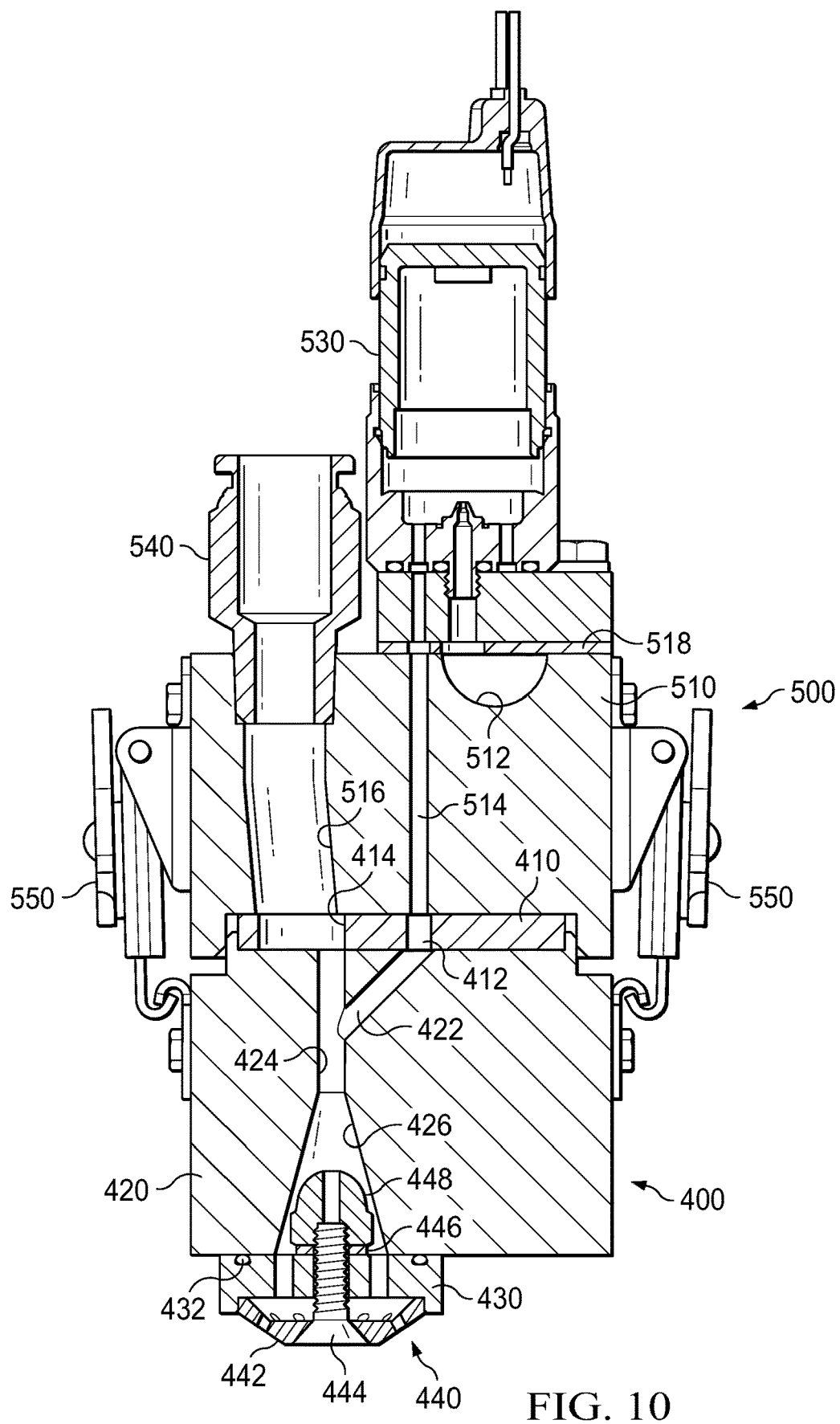
FIG. 10 is a cross-sectional side view of an example implementation of a spray nozzle manifold included in the disclosed industrial baking pan greasing system.
Figure 11:
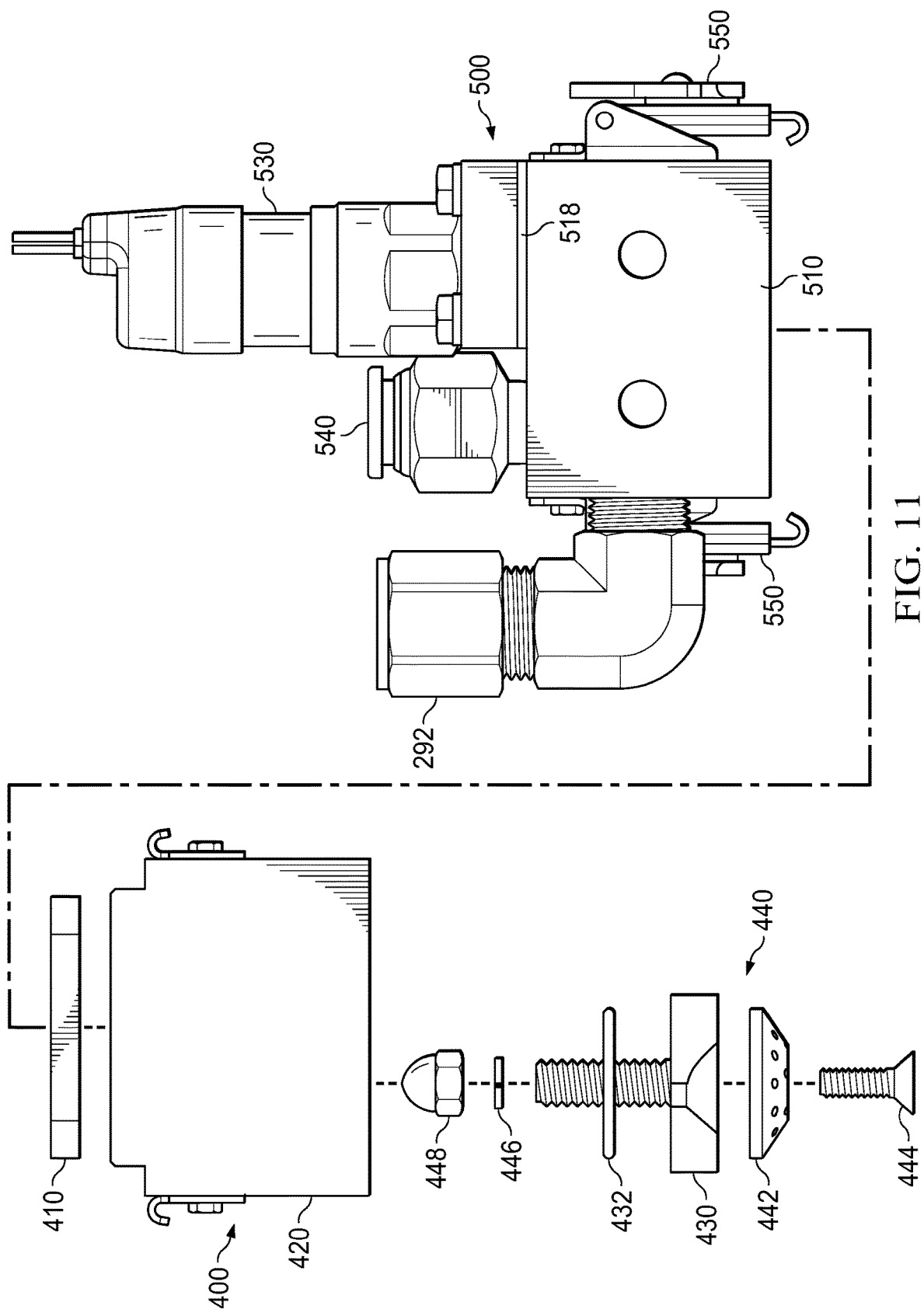
FIG. 11 is an exploded side view of the spray nozzle manifold of FIG. 10.
Figure 12:
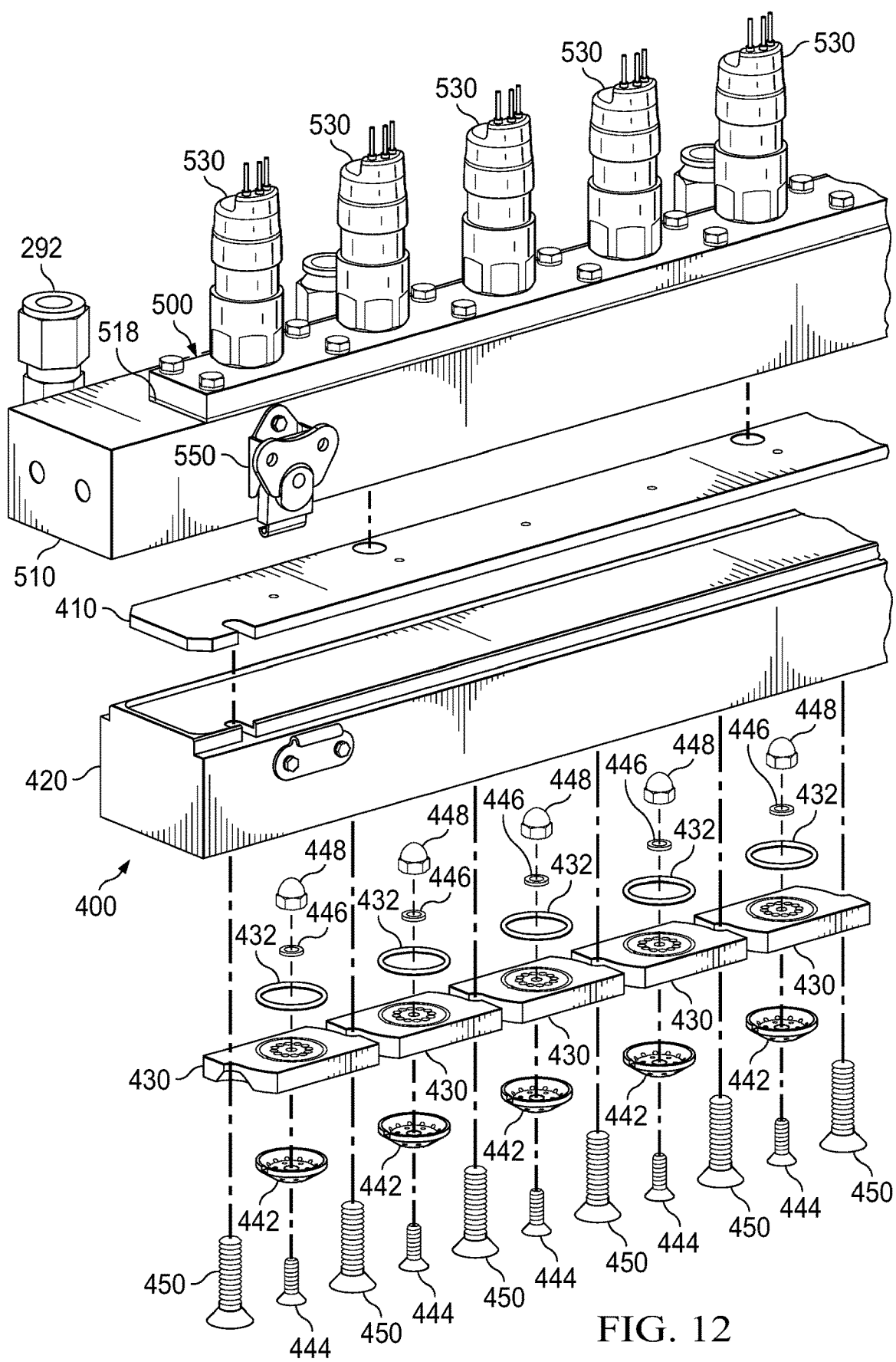
FIG. 12 is an exploded left perspective view of the spray nozzle manifold of FIG. 10.
Figure 13:
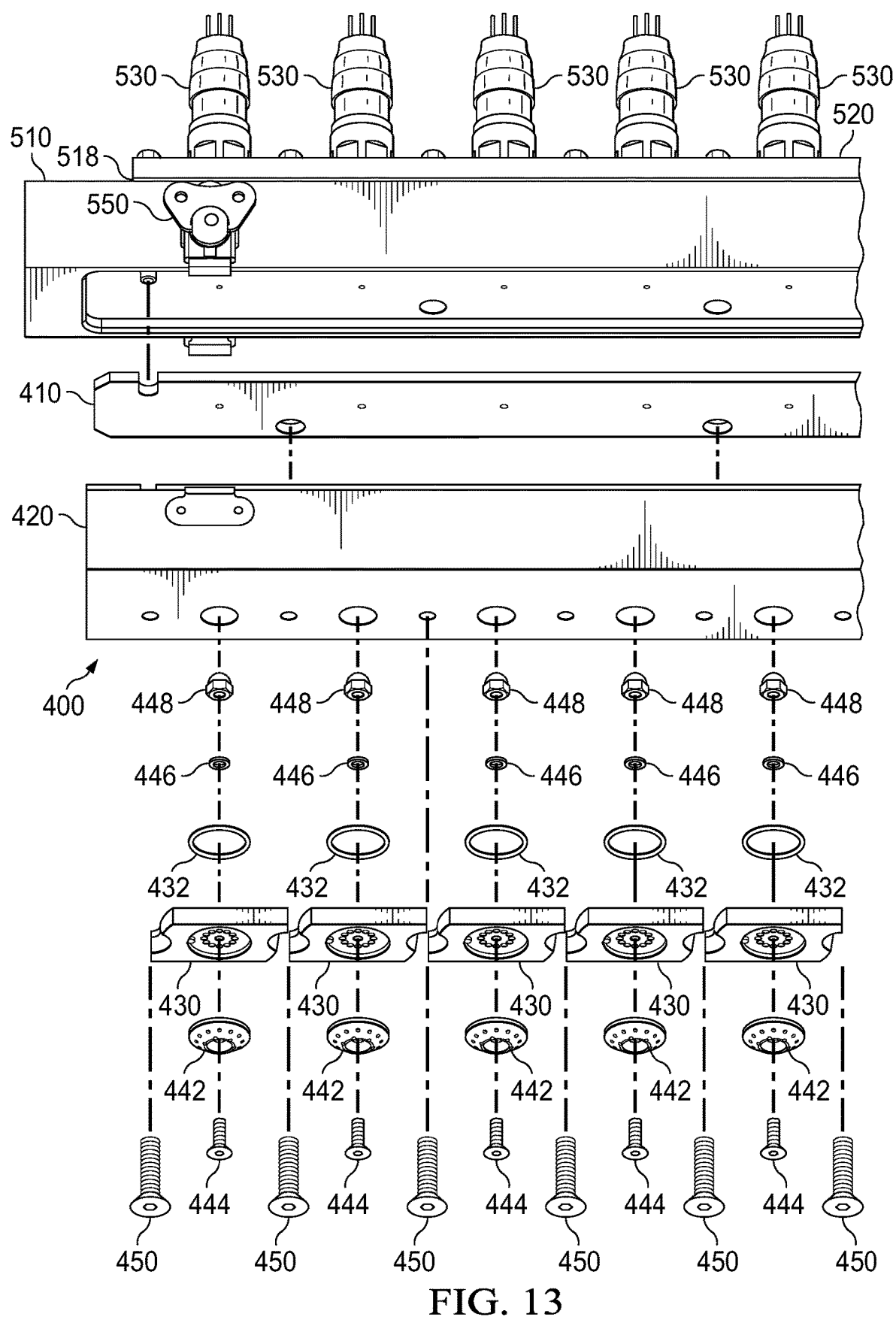
FIG. 13 is an exploded bottom perspective view of the spray nozzle manifold of FIG. 10.
Figure 14A:
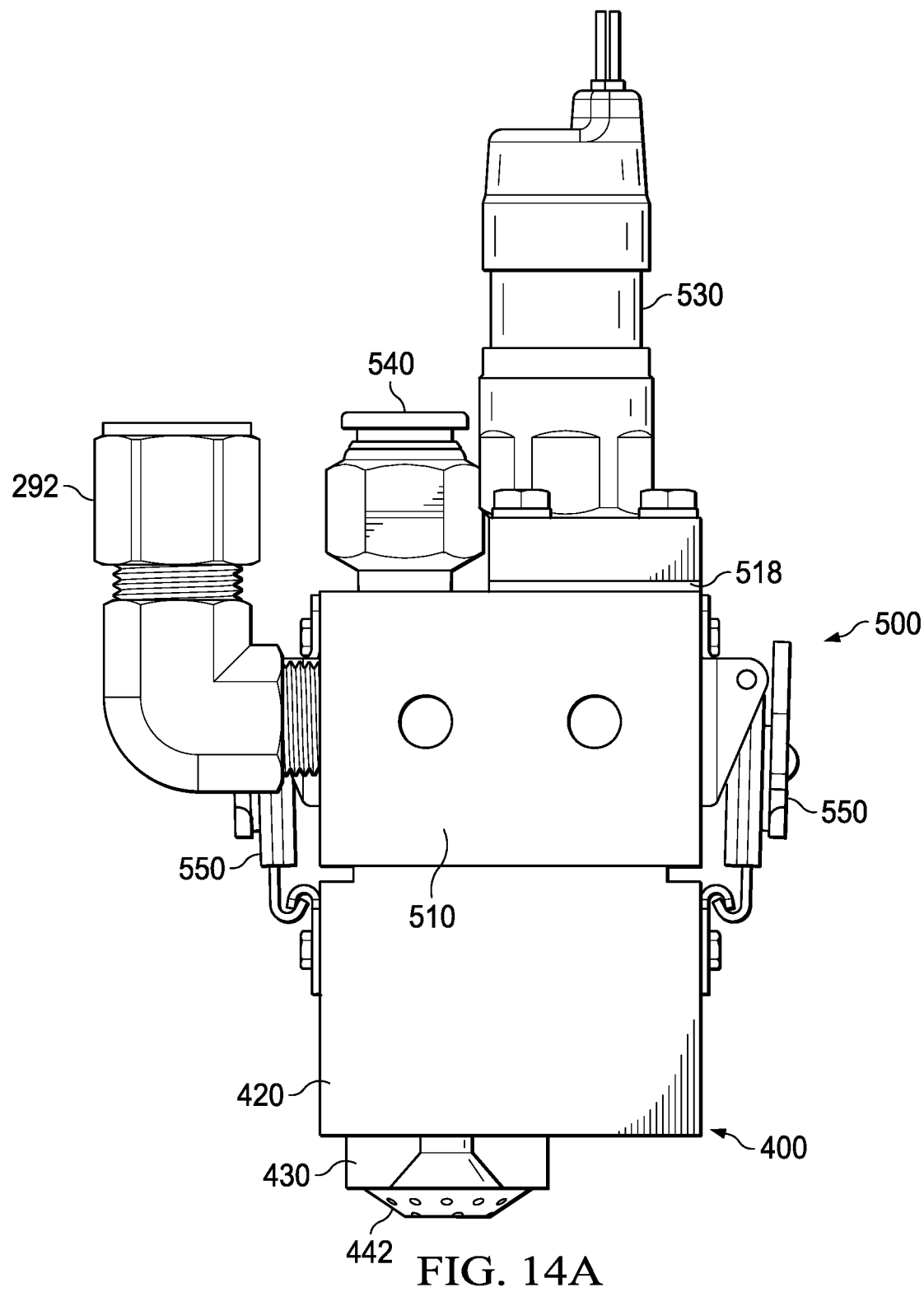
FIG. 14A is a side view of the spray nozzle manifold of FIG. 10, wherein the nozzle bar component of the spray nozzle manifold is attached to the valve bar component of the spray nozzle manifold.
Figure 14B:
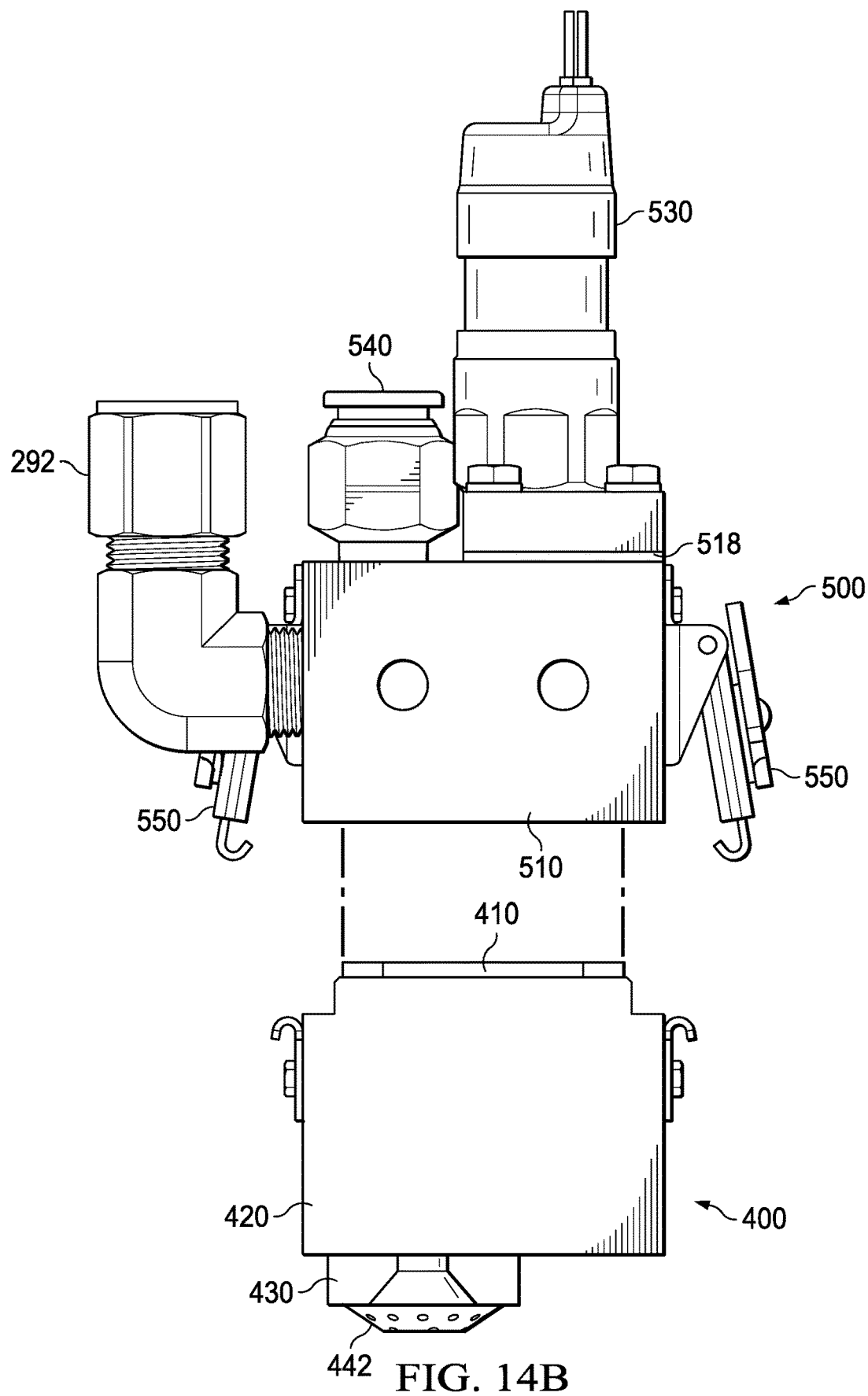
FIG. 14B is a partially exploded side view of the spray nozzle manifold of FIG. 14A, wherein the nozzle bar component of the spray nozzle manifold has been detached from the valve bar component of the spray nozzle manifold.

FIG. 10 provides a cross-sectional side view of an example implementation of a spray nozzle manifold included in the disclosed industrial baking pan greasing system including a cross-sectional view of the air input portion of the spray nozzle manifold and a cross-sectional view of the solenoid grease valve portion of the spray nozzle manifold; FIG. 11 provides an exploded side view of the spray nozzle manifold of FIG. 10; FIG. 12 provides an exploded left perspective view of the spray nozzle manifold of FIG. 10; FIG. 13 provides an exploded bottom perspective view of the spray nozzle manifold of FIG. 10; FIG. 14A provides a side view of the spray nozzle manifold of FIG. 10, wherein the nozzle bar component of the spray nozzle manifold is attached to the valve bar component of the spray nozzle manifold; and FIG. 14B provides a partially exploded side view of the spray nozzle manifold of FIG. 14A, wherein the nozzle bar component of the spray nozzle manifold has been detached from the valve bar component of the spray nozzle manifold. With reference to FIGS. 10 through 14A-14B, spray nozzle manifold 300 includes nozzle bar assembly 400 and valve bar assembly 500. Nozzle bar assembly 400 is detachably connected to valve bar assembly 500 and may be removed for cleaning and servicing or running different pans, which may include replacing one or more spray nozzle components or spray nozzle subassemblies.

Figure 15:
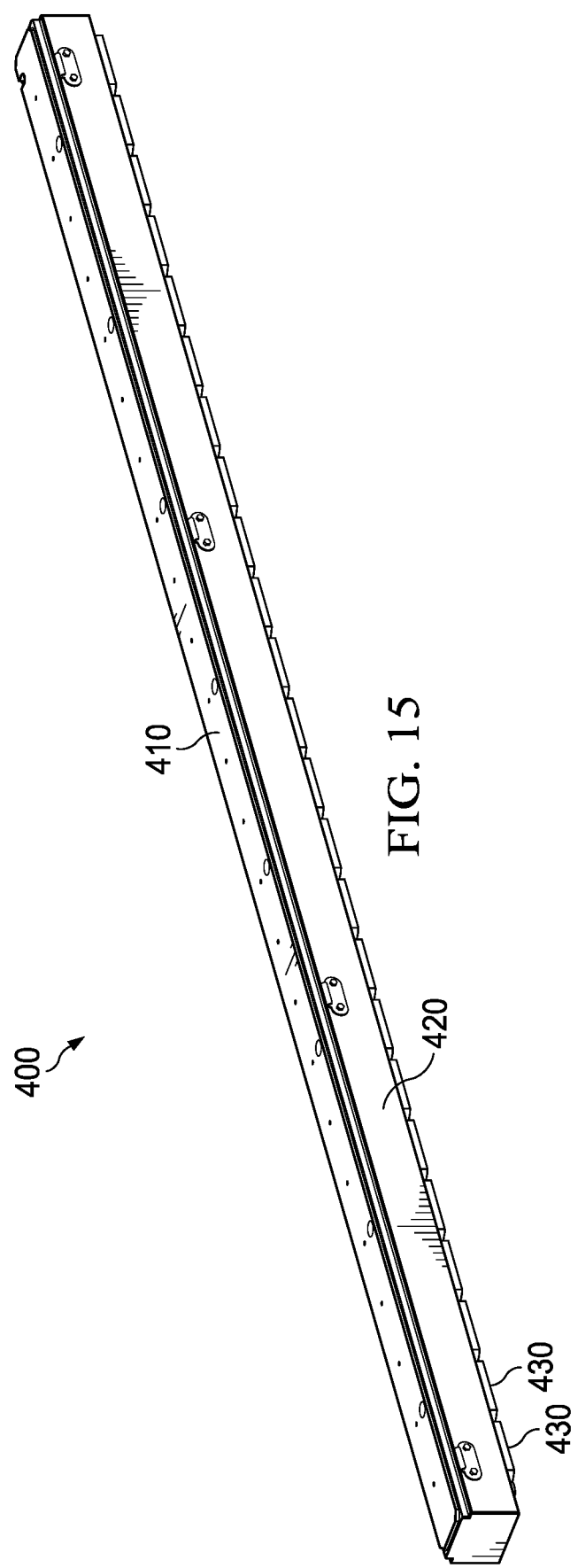
FIG. 15 is a left perspective view of an example implementation of the nozzle bar component of the disclosed spray nozzle manifold, wherein the nozzle bar is fully assembled.
Figure 16:
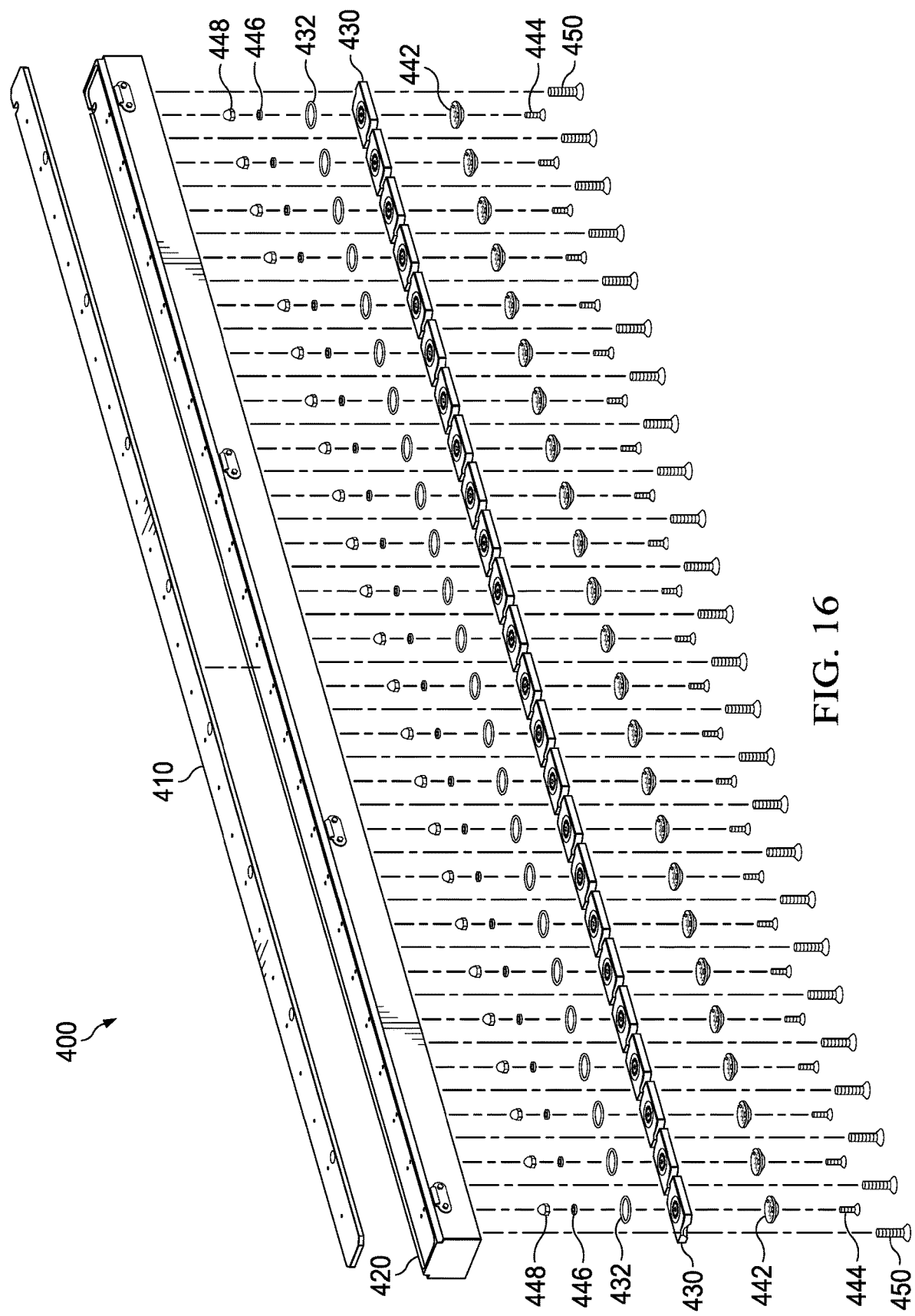
FIG. 16 is an exploded perspective view of the nozzle bar component of FIG. 15.
Figure 17:
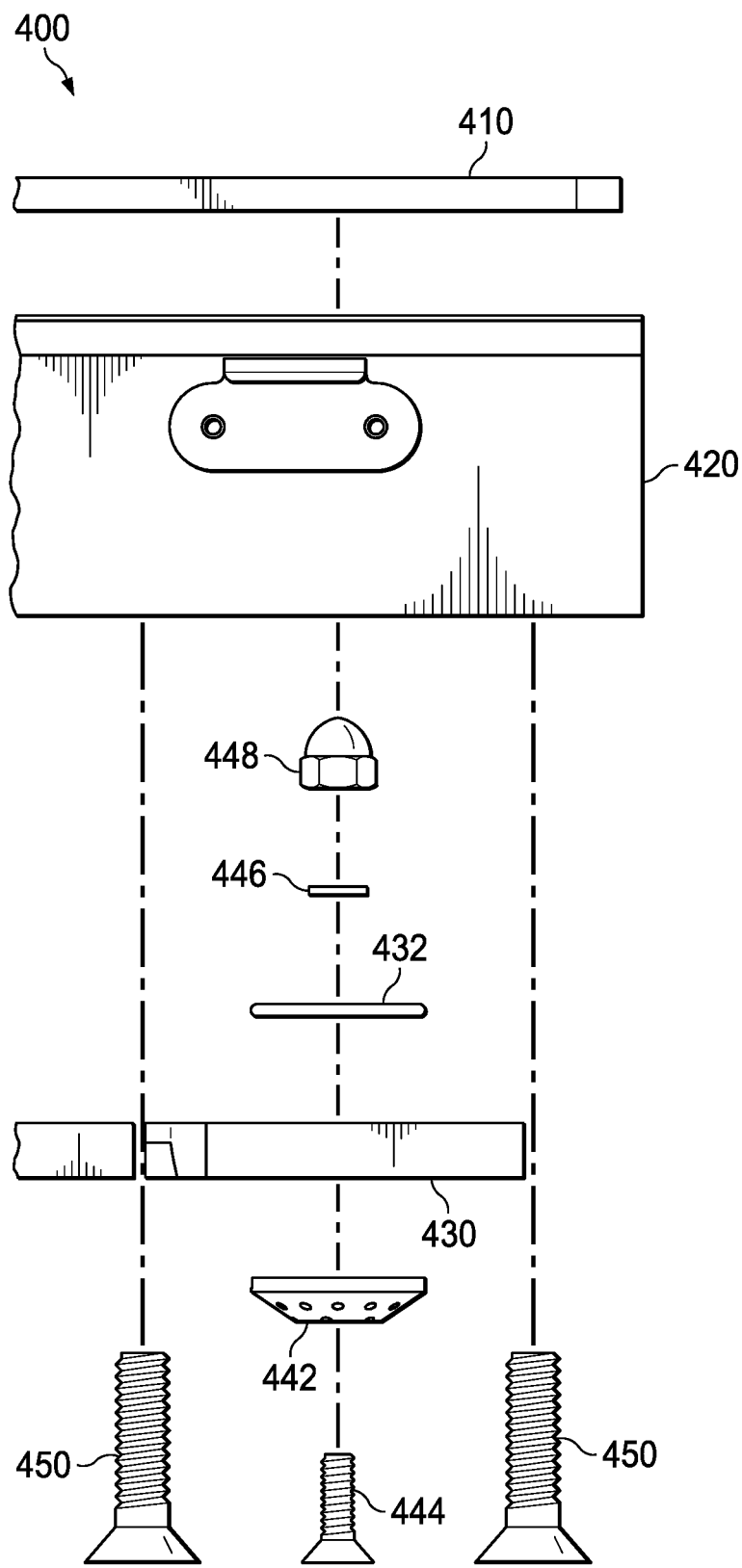
FIG. 17 is an exploded side view of the nozzle bar component of FIG. 15.
Figure 18:
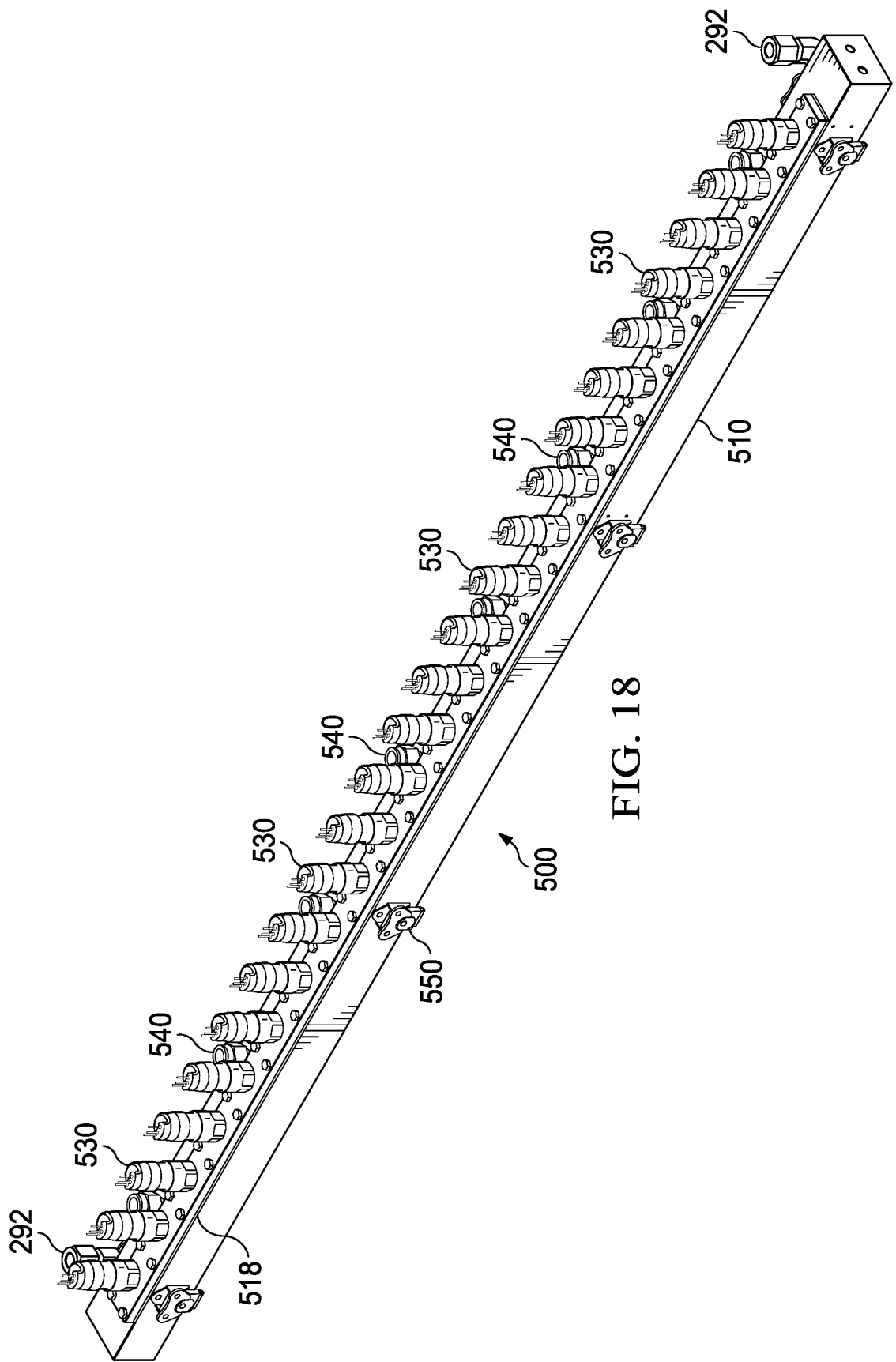
FIG. 18 is a right side perspective view of an example implementation of the valve bar component of the disclosed spray nozzle manifold.
Figure 19:
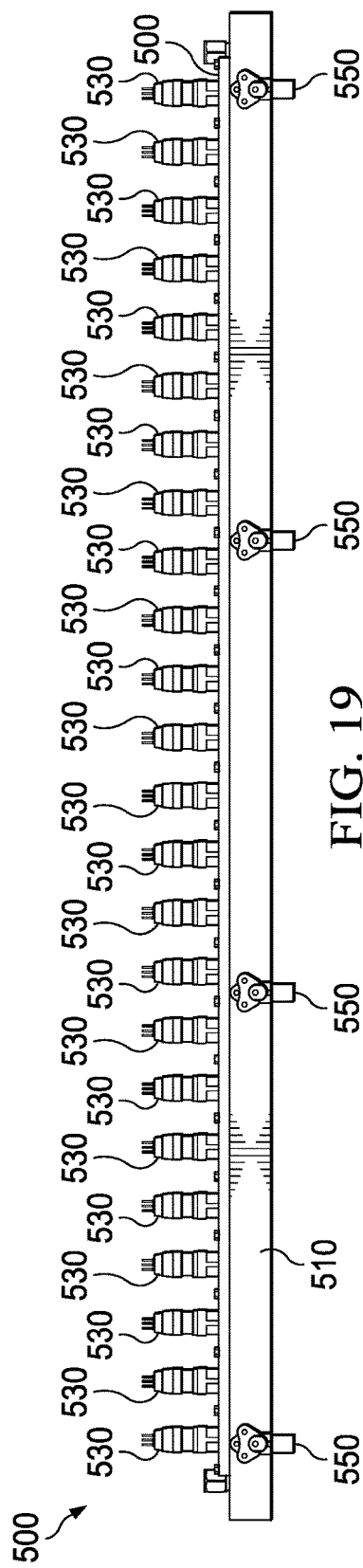
FIG. 19 is a side view of the valve bar component of FIG. 18.
Figure 20:
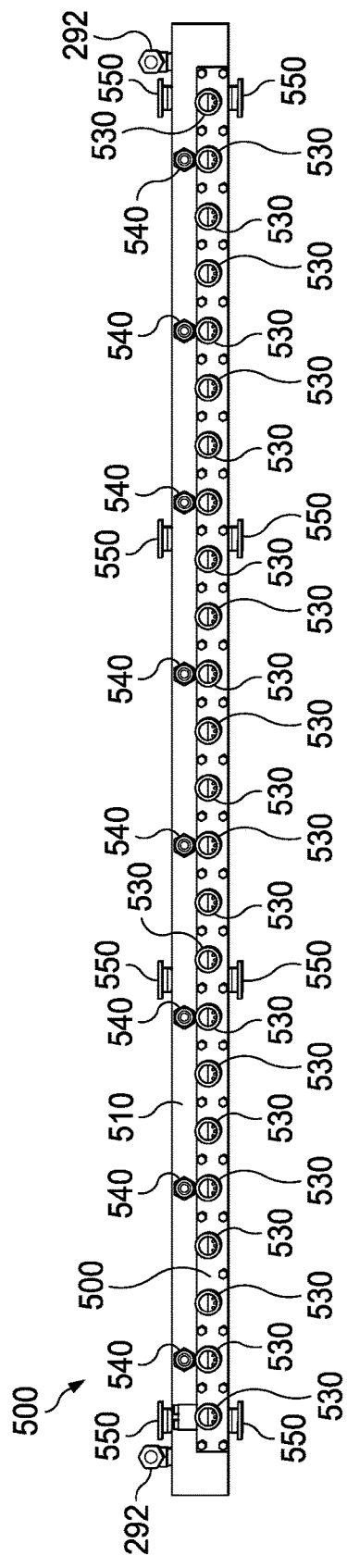
FIG. 20 is a top view of the valve bar component of FIG. 18.
Figure 21:
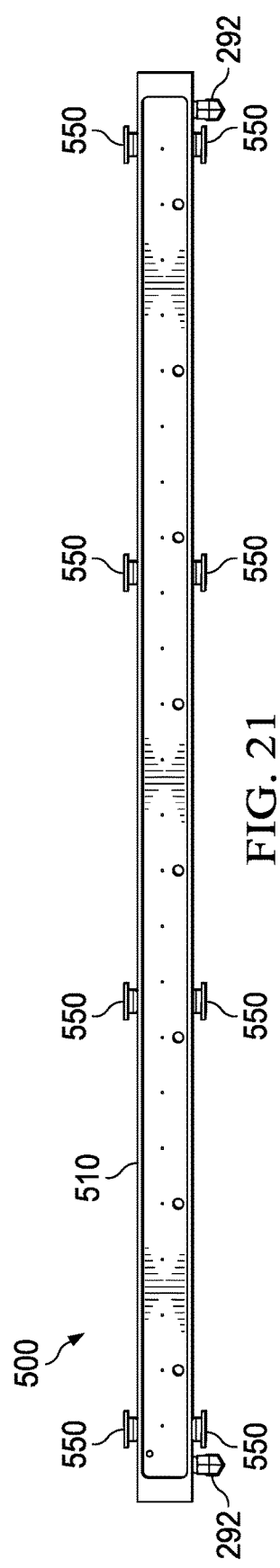
FIG. 21 is a bottom view of the valve bar component of FIG. 18.
Figure 22:
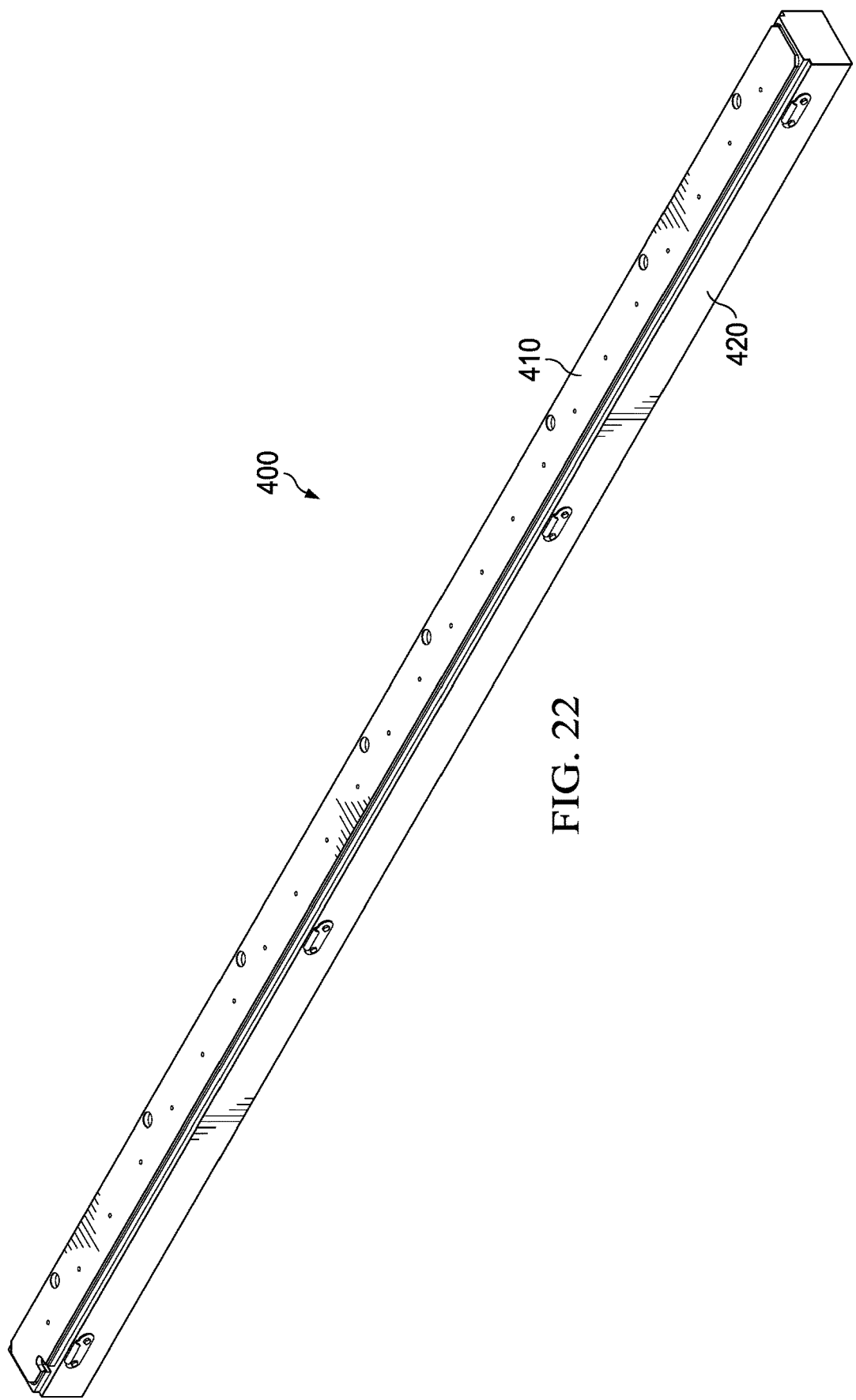
FIG. 22 is a right side perspective view of another example implementation of the nozzle bar component of the disclosed spray nozzle manifold.
Figure 23:
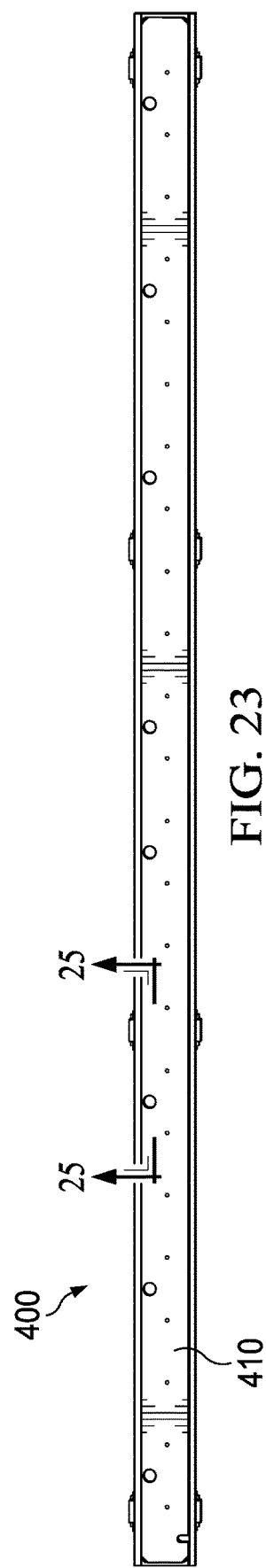
FIG. 23 is a top view of the nozzle bar component of FIG. 22.
Figure 24:
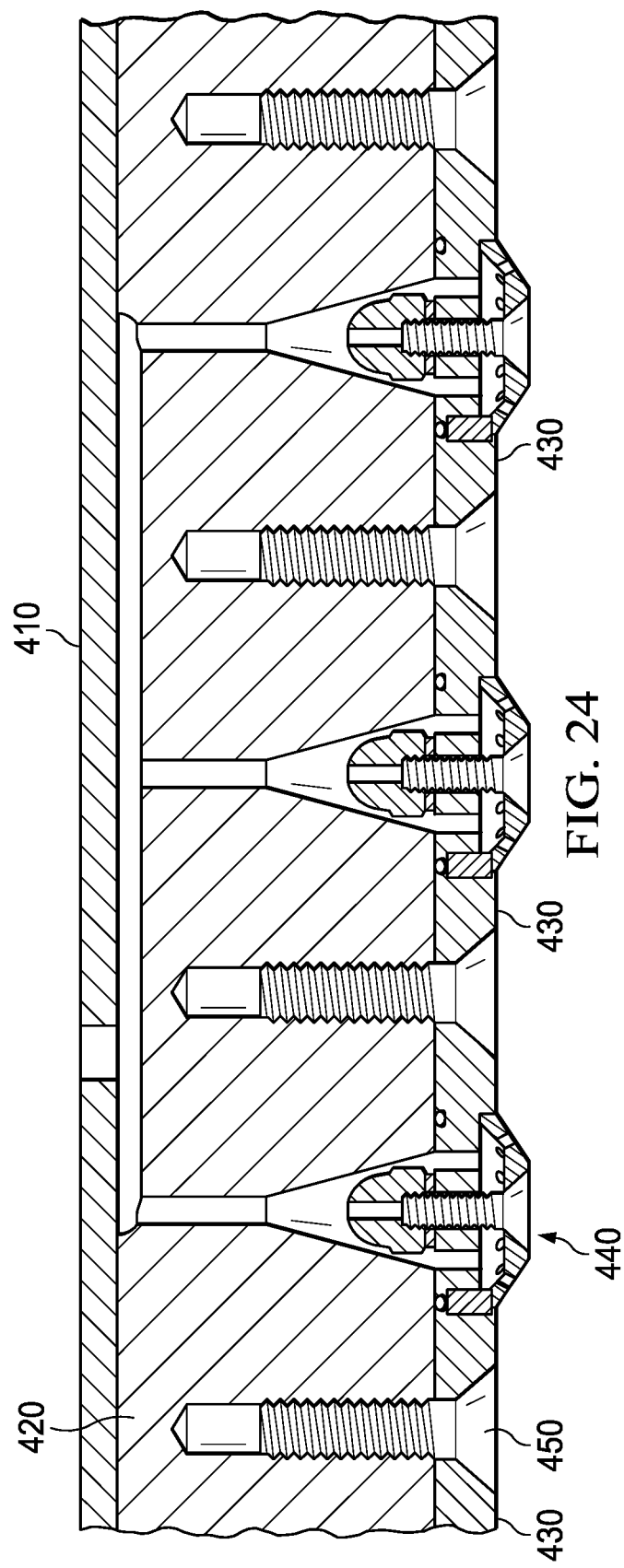
FIG. 24 is a cross-sectional side view of the nozzle bar component of FIG. 22.
Figure 25A:
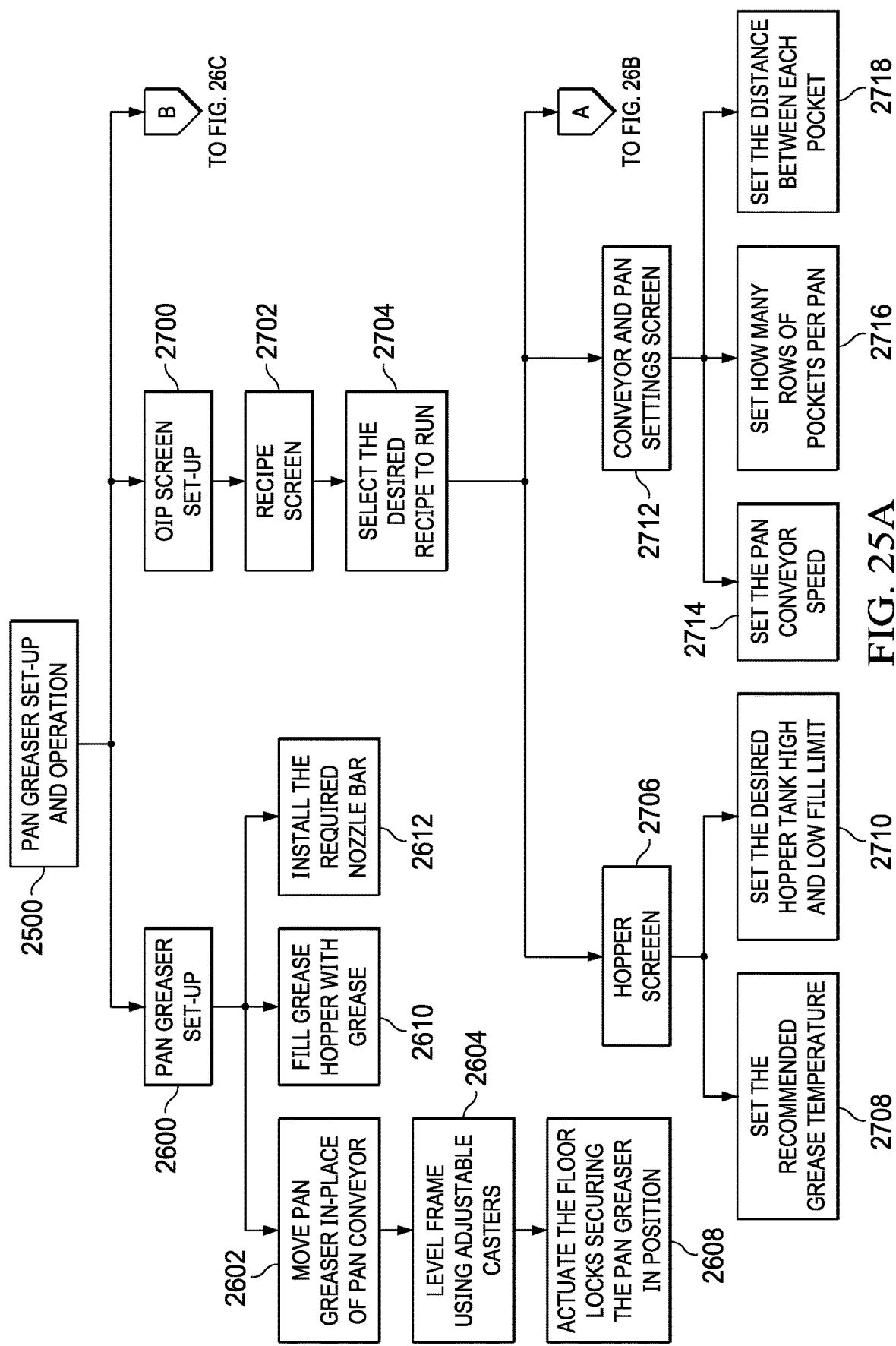
FIGS. 25A-25E comprise a flowchart depicting exemplary operational aspects of an implementation the disclosed industrial baking pan greasing system.
Figure 25B:
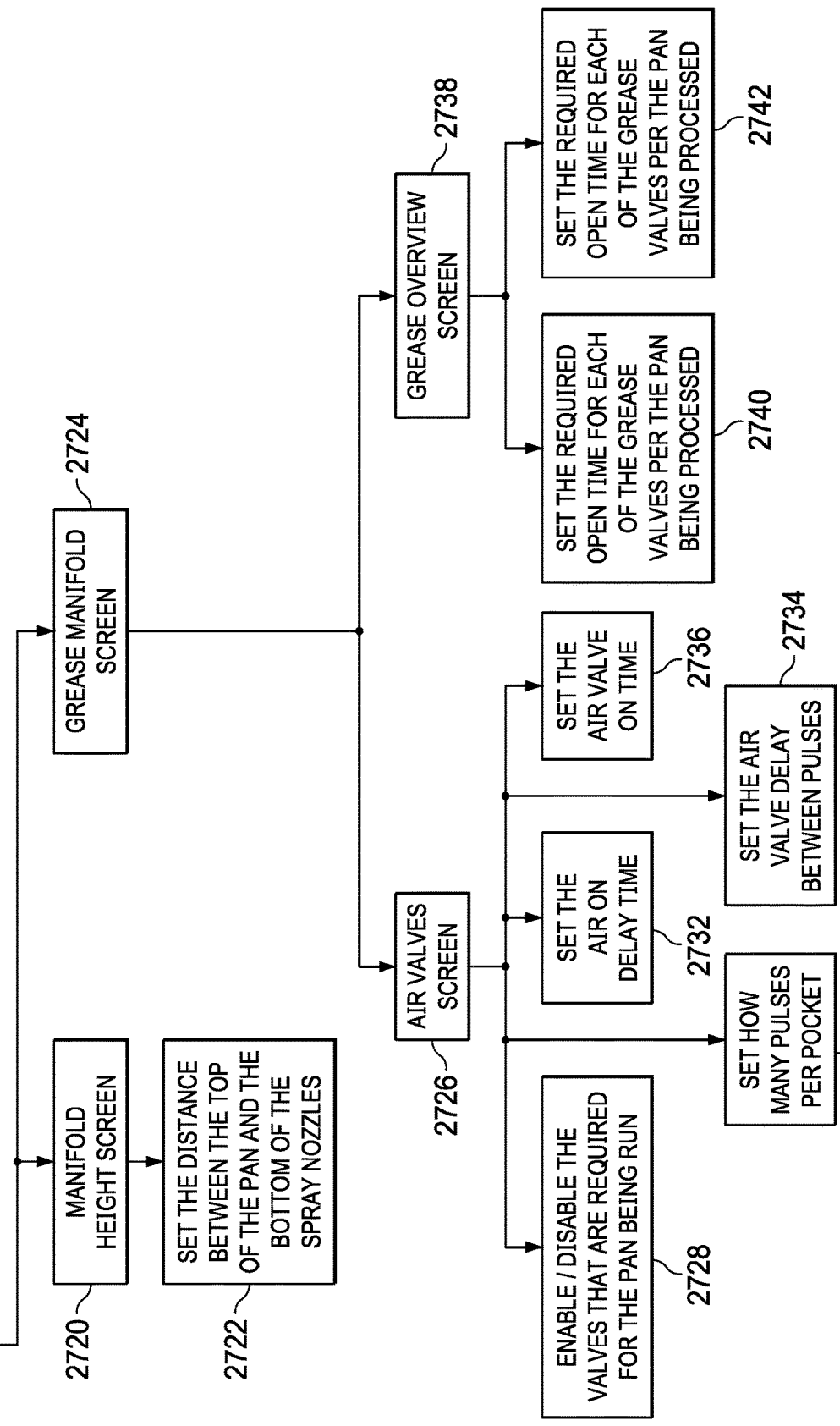
Figure 25C:
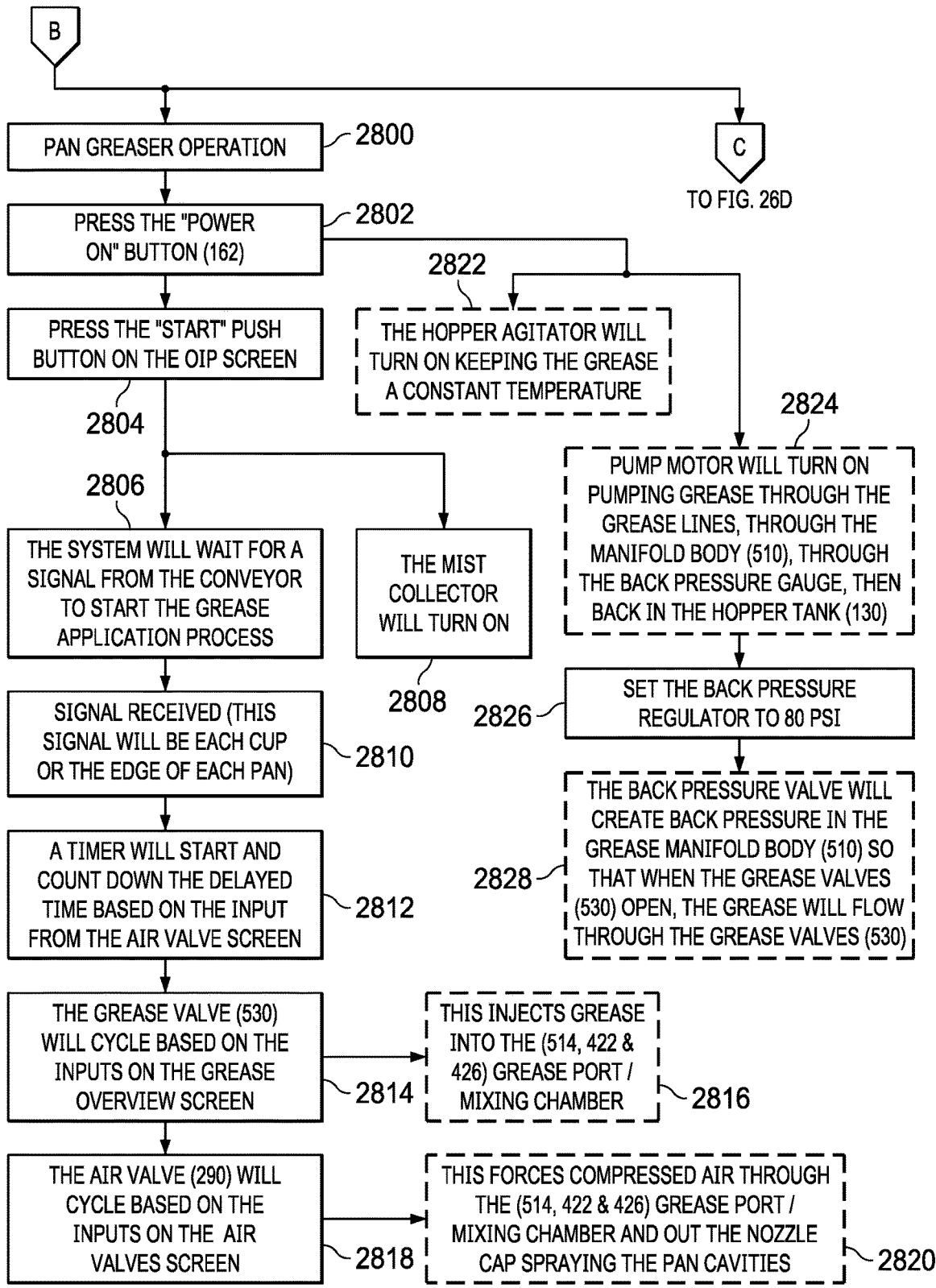
Figure 25D:
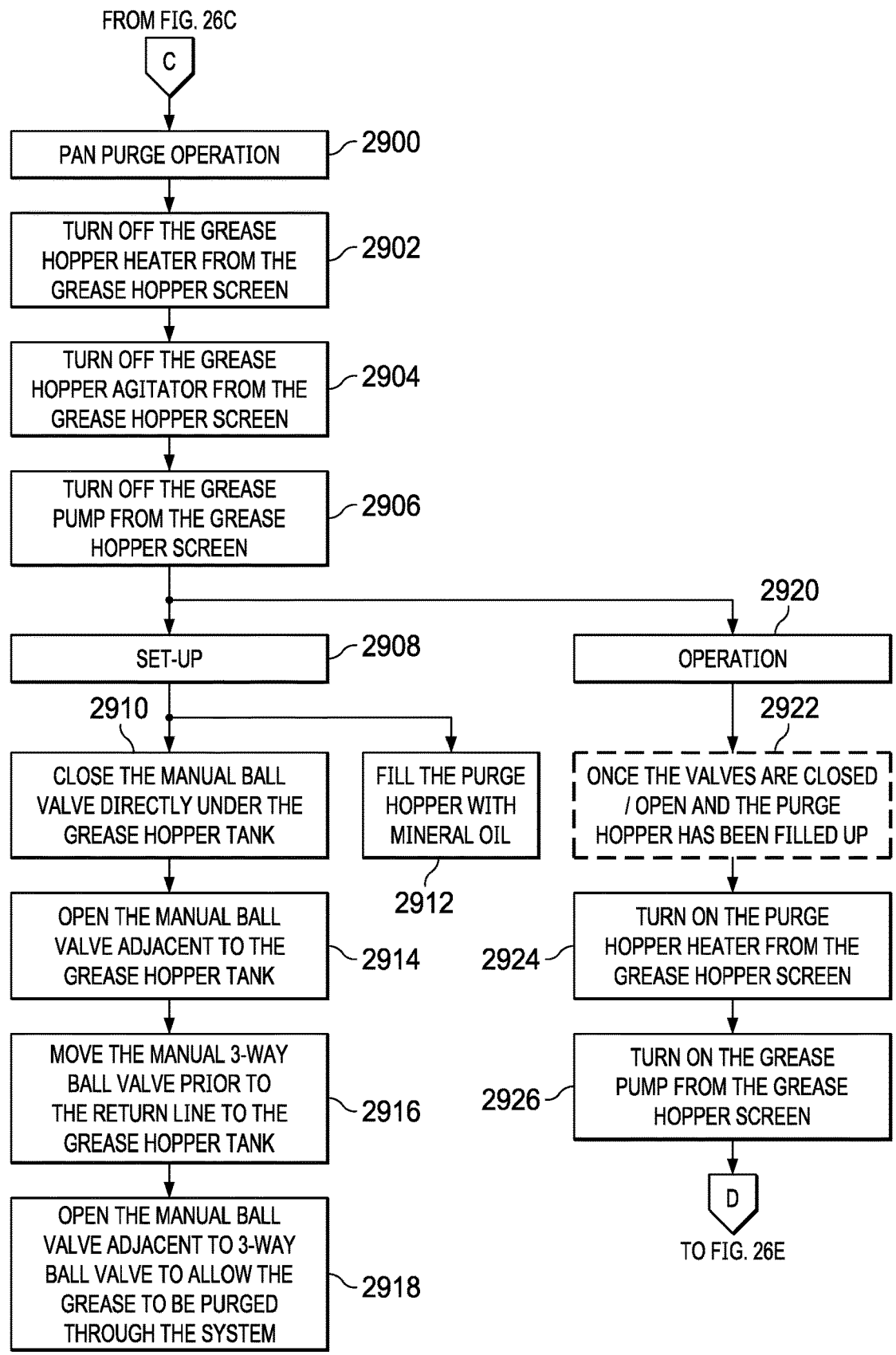
Figure 25E:
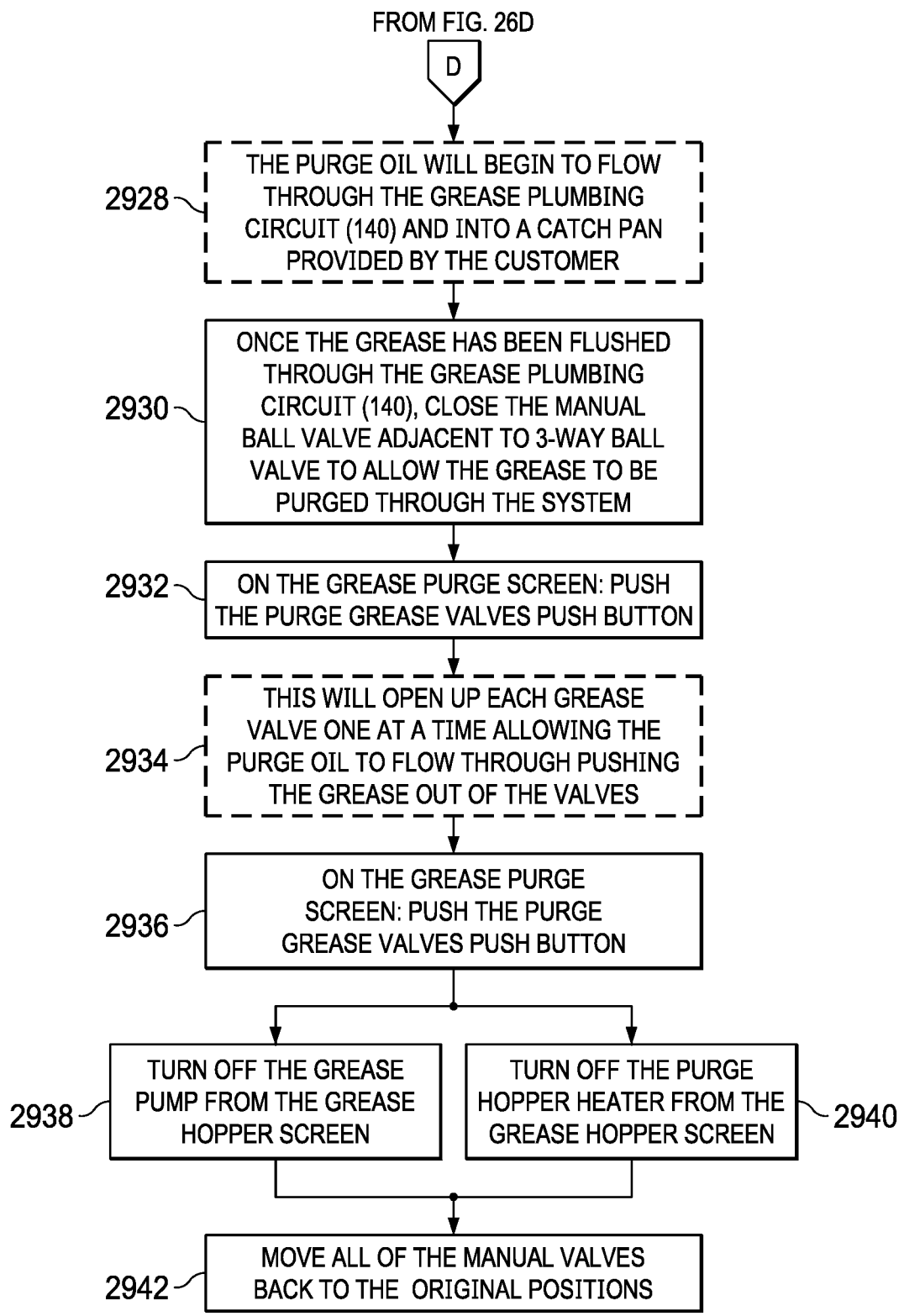

FIG. 15 provides a left perspective view of an example implementation of the nozzle bar assembly of the disclosed spray nozzle manifold, wherein the nozzle bar is fully assembled; FIG. 16 provides an exploded perspective view of the nozzle bar assembly of FIG. 15 showing the relative positions of the various components thereof; FIG. 17 provides an exploded side view of the nozzle bar assembly of FIG. 15; FIG. 18 provides a right side perspective view of an example implementation of the valve bar assembly of the disclosed spray nozzle manifold; FIG. 19 provides a side view of the valve bar assembly of FIG. 18; FIG. 20 provides a top view of the valve bar assembly of FIG. 18; FIG. 21 provides a bottom view of the valve bar assembly of FIG. 18; FIG. 22 provides a right side perspective view of another example implementation of the nozzle bar assembly of the disclosed spray nozzle manifold; FIG. 23 provides a top view of the nozzle bar assembly of FIG. 22; and FIG. 24 provides a cross-sectional side view of the nozzle bar assembly of FIG. 22.

With reference to FIGS. 10-24, spray nozzle manifold 300 has a two-part construction that includes nozzle bar assembly 400 and valve bar assembly 500. Nozzle bar assembly 400 includes nozzle seal 410; nozzle mounting plate or diverter 420; and nozzle subassembly 440. As best shown in FIG. 10, nozzle seal 410 includes grease port 412 and air port 414, through which lubricant and air pass, respectively. Nozzle diverter 420 includes grease channels 422 and air channels 424, through which lubricant and air pass, respectively, and chambers 426. Using solenoid valves 530, grease (lubricant) is injected into each chamber 426, then pressurized/compressed air is fired using valves 290, thereby pushing the grease outward through the spray nozzles in droplet form (no mist is formed). Nozzle cap mounting plate 430, which is also ported for permitting passage of the lubricant, is connected to the bottom of nozzle diverter 420 using a series of flat head screws 450. Nozzle O-ring 432 forms a seal between nozzle diverter 420 and nozzle cap mounting plate 430. Each spray nozzle includes a nozzle subassembly 440, which further includes a perforated nozzle cap 442 that is attached to nozzle mating plate 430 using nozzle cap retaining screw 444; lock washer 446; and nozzle cap retaining cap nut 448.

Valve bar assembly 500 includes manifold body 510, which further includes grease reservoirs 512; grease ports 514; and air ports 516 through which lubricant and air pass, respectively. An air fitting 540 is mounted at the upper end of each air port 516, and is configured to receive a controlled air blast through an air manifold assembly valve 290. Valve bar assembly 500 is connected to the top of manifold body 510 and is adapted to receive a plurality of proportional solenoid grease valves 530 (e.g. Enfield Technologies: PFV-W24E02-M100C-0500). A series of nozzle bar retaining latches 550 are used to join valve bar assembly 500 to nozzle bar assembly 400.

FIGS. 25A-25E provide, across multiple pages, a single flowchart depicting exemplary operational aspects of an implementation the disclosed industrial baking pan greasing system. Pan greater and set up method 2500 includes pan greater setup method 2600; OIP screen set-up method 2700; pan greater operation method 2800; and pan purge method 2900. Pan greater setup method 2600 includes moving the pan greater in-place of the pan conveyer at step 2602; leveling the frame using adjustable casters at 2604; and actuating the floor locks securing the pan greater in position at step 2608. The grease hopper is filled with grease at step 2610; and the required nozzle bar is installed at step 2613.

OIP screen set-up method 2700 includes accessing the recipe screen at step 2702 and selecting the desired recipe to run at step 2704. The hopper screen is accessed at step 2706; the recommended grease temperature is set at step 2708 and the desired hopper tank high and low fill limits are set at step 2710. The conveyor and pan settings screen is accessed at step 2712; the pan conveyor speed is set at 2714; the number of rows of pockets per pan is set at step 2716; and the distance between each pocket is set at step 2718. The manifold height screen is accessed at step 2720; and the distance between the top of the pan and the bottom of the spray nozzles is set at step 2722. The grease manifold screen is accessed at step 2724. The air valve screen is accessed at step 2726; the valves that are required for the pan being run are enabled or disabled at step 2728; the number of pulses per pocket is set at step 2730; the air on delay time is set at step 2732; the air valve delay between pulses is set at step 2734; and the air valve on time is set at step 2736. The grease overview screen is accessed at step 2738; the required open time for each of the grease valves per the pan being processed is set at step 2740; and the required open time for each of the grease valves per the pan being processed is set at step 2742.

Pan greater operation method 2800 includes pressing the "power on" button at step 2802; and pressing the "start" push button on the OIP screen at step 2804. The system will wait for a signal from the conveyor to start the grease application process at step 2806; and the mist collector will turn on at step 2808. A signal will be received at step 2810 (this signal will be each cup or the edge of each pan); a timer will start and count down the delayed time based on the input from the air valve screen at step 2812; the grease valve will cycle based on the inputs on the grease overview screen at 2814, which will inject grease into the grease port/mixing chamber at step 2816; and the air valve will cycle based on the inputs on the air valves screen at step 2818, which forces compressed air through the grease port/mixing chamber and out the nozzle cap, thereby spraying the pan cavities at step 2820. Additionally, by pressing the "power on" button at step 2802, the hopper agitator turns on, thereby keeping the grease at a constant temperature at step 2822; the pump motor turns, thereby pumping grease through the grease lines, through the manifold body, through the back pressure gauge, then back into the hopper tank at step 2824; the back pressure regulator is set at step 2826; and at step 2828, the back pressure valve will create back pressure in the grease manifold body so that when the grease valves open, the grease will flow through the grease valves.

Pan purge operation method 2900 includes turning off the grease hopper heater from the grease hopper screen at step 2902; turning off the grease hopper agitator from the grease hopper screen at 2904; and turning off the grease pump from the grease hopper screen at 2906. Set-Up begins at step 2908 and includes closing a manual ball valve directly under the grease hopper tank at step 2910; filling the purge hopper with mineral oil at step 2912; opening the manual ball valve adjacent to the grease hopper tank at step 2914; moving the manual 3-way ball valve prior to the return line to the grease hopper tank at step 2916; and opening the manual ball valve adjacent to the 3-way ball valve to allow the grease to be purged through the system at step 2918. Operation 2920 includes (once the valves are closed/open and the purge hopper has been filled at step 2922), turning on the purge hopper heater from the grease hopper screen at step 2924; and turning on the grease pump from the grease hopper screen at 2926. The purge oil will begin to flow through the grease plumbing circuit and into a catch pan provided by the customer at step 2928; once the grease has been flushed through the grease plumbing circuit, the manual ball valve adjacent to the 3-way ball valve is closed to allow the grease to be purged through the system at step 2930; on the grease purge screen, the purge grease valves push button is depressed at step 2932, thereby opening each grease valve, one at a time allowing the purge oil to flow through pushing the grease out of the valves at step 2934. On the grease purge screen, the purge grease valves push button is depressed at step 2936. The grease pump is turned off from the grease hopper screen at step 2938; the purge hopper heater is turned off from the grease hopper screen at step 2940; and all of the manual valves are moved back to their original positions at step 2942.

Unlike prior art systems that utilize piston pumps or other mechanical devices that require moving parts, a primary advantage of the disclosed industrial baking pan greasing system is the use of pressurized air and a series of precisely controlled proportional solenoid valves to propel lubricant (e.g., grease) out of spray nozzle manifold 300 through a plurality of spray nozzles 440 and onto a baking pan or other baking surface without atomization or the creation of mist. To avoid undesirable misting, the disclosed system creates droplets of lubricant that evenly cover a baking surface. Each air blast may be in the range of 10-20 psi and may be spaced milliseconds apart. Each spray nozzle can electronically be adjusted or altered independently of the other spray nozzles, or the entire manifold may be adjusted. Additionally, each spray nozzle is separate and independent from the other spray nozzles and may be removed for repair and cleaning without affecting the other spray nozzles. As previously described, nozzle bar assembly 400 can removed for cleaning or product changing with no required disconnection of grease or air lines, unlike existing commercial units that can include, for example, as many as forty separate connections that must be manipulated. The disclosed system also includes no "dead ends" for grease passages where specific nozzles are not being used, as the circulation of grease through the system is continuous. The disclosed system design also eliminates: (i) small orifices typically found in atomizing nozzles on other commercial units that can create areas of plugging; and (ii) check valves that can create major points of failure.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about", if or when used throughout this specification describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the figures, only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection; a direct connection, or an indirect connection through an intermediate medium. For an ordinary skilled in the art, the specific meaning of the above terms in the disclosed technology may be understood according to specific circumstances.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:

1. A greasing system, comprising:
   (a) a source of lubricant;
   (b) a source of pressurized air;
   (c) a spray nozzle assembly in communication with the source of lubricant and the source of pressurized air, wherein the spray nozzle assembly includes a spray nozzle manifold, and wherein the spray nozzle manifold further includes:
      (i) a valve bar assembly, wherein the valve bar assembly further includes:
         a) a lubricant reservoir in fluid communication with the source of lubricant;
         b) a plurality of proportional solenoid valves in fluid communication with the lubricant reservoir;
         c) a plurality of lubricant passages in fluid communication with the plurality of proportional solenoid valves;
         d) a plurality air passages in communication with the source of pressurized air; and
         e) a plurality of valves positioned in-line between the source of pressurized air and each air passage in the plurality air passages; and
      (ii) a nozzle bar assembly detachably connected to the valve bar assembly, wherein the nozzle bar assembly is specific to a predetermined style of pan, and wherein the nozzle bar assembly further includes:
         a) a plurality of lubricant passages in fluid communication with the plurality of lubricant passages in the valve bar assembly;
         b) a plurality of air passages in communication with the a plurality of air passages in the valve bar assembly;
         c) a plurality of chambers, wherein each chamber in the plurality of chambers is in communication with a corresponding lubricant passage in the nozzle bar assembly and a corresponding air passage in the nozzle bar assembly, and wherein a predetermined volume of lubricant is deposited in each chamber through the lubricant passage; and
         d) a spray nozzle in communication with each chamber, wherein the pressurized air propels the lubricant from the spray nozzle in the form of droplets.

2. The system of claim 1, wherein the lubricant includes edible grease.

3. The system of claim 1, wherein the spray nozzle assembly further includes a mist collecting device.

4. The system of claim 1, wherein the spray nozzle assembly further includes an enclosure having a lid which may be opened and closed.

5. The system of claim 1, further comprising a supportive frame on which the source of lubricant, source of pressurized air, and spray nozzle assembly are mounted.

6. The system of claim 5, wherein the supportive frame further includes a gantry arm on which the spray nozzle assembly is mounted.

7. The system of claim 1, further comprising a seal disposed between the valve bar assembly and the nozzle bar assembly.

8. The system of claim 1, further comprising an air manifold assembly.

9. The system of claim 1, further comprising a controller for providing operational commands to the spray nozzle assembly.

10. The system of claim 1, wherein the plurality of proportional solenoid valves includes up to individual solenoid valves.

11. The system of claim 1, wherein each solenoid valve in the plurality of proportional solenoid valves is adjustable, removable, and replaceable independent of the other solenoid valves.

12. A pan greasing system, comprising:
   (a) a source of lubricant;
   (b) a source of pressurized air;
   (c) a spray nozzle assembly in communication with the source of lubricant and the source of pressurized air, wherein the spray nozzle assembly includes a spray nozzle manifold, and wherein the spray nozzle manifold further includes:
      (i) a valve bar assembly, wherein the valve bar assembly further includes:
         a) a lubricant reservoir in fluid communication with the source of lubricant;
         b) a plurality of proportional solenoid valves in fluid communication with the lubricant reservoir;
         c) a plurality of lubricant passages in fluid communication with the plurality of proportional solenoid valves;
         d) a plurality air passages in communication with the source of pressurized air; and
         e) a plurality of valves positioned in-line between the source of pressurized air and each air passage in the plurality air passages; and
      (ii) a nozzle bar assembly detachably connected to the valve bar assembly, wherein the nozzle bar assembly is specific to a predetermined style of pan, and wherein the nozzle bar assembly further includes:
         a) a plurality of lubricant passages in fluid communication with the plurality of lubricant passages in the valve bar assembly;
         b) a plurality of air passages in communication with the a plurality of air passages in the valve bar assembly;
         c) a plurality of chambers, wherein each chamber in the plurality of chambers is in communication with a corresponding lubricant passage in the nozzle bar assembly and a corresponding air passage in the nozzle bar assembly, and wherein a predetermined volume of lubricant is deposited in each chamber through the lubricant passage; and
         d) a spray nozzle in communication with each chamber, wherein the pressurized air propels the lubricant from the spray nozzle in the form of droplets; and
      (iii) a seal disposed between the valve bar assembly and the nozzle bar assembly; and
   (d) an enclosure for housing the spray nozzle assembly, wherein the enclosure includes a lid which may be opened and closed.

13. The system of claim 12, wherein the spray nozzle assembly further includes a mist collecting device.

14. The system of claim 12, further comprising a supportive frame on which the source of lubricant and source of pressurized air are mounted, wherein the supportive frame further includes a gantry arm on which the spray nozzle assembly and enclosure are mounted.

15. The system of claim 12, further comprising an air manifold assembly.

16. The system of claim 12, further comprising a controller for providing operational commands to the spray nozzle assembly.

17. The system of claim 12, wherein the plurality of proportional solenoid valves includes up to 40 individual solenoid valves, and wherein each solenoid valve is adjustable, removable, and replaceable independent of the other solenoid valves.

18. An industrial pan greasing system, comprising:
(a) a source of lubricant;
(b) a source of pressurized air;
(c) a spray nozzle assembly in communication with the source of lubricant and the source of pressurized air, wherein the spray nozzle assembly includes a spray nozzle manifold, and wherein the spray nozzle manifold further includes:
  (i) a valve bar assembly, wherein the valve bar assembly further includes:
    a) a lubricant reservoir in fluid communication with the source of lubricant;
    b) a plurality of proportional solenoid valves in fluid communication with the lubricant reservoir;
    c) a plurality of lubricant passages in fluid communication with the plurality of proportional solenoid valves;
    d) a plurality air passages in communication with the source of pressurized air; and
    e) a plurality of valves positioned in-line between the source of pressurized air and each air passage in the plurality air passages; and
  (ii) a nozzle bar assembly detachably connected to the valve bar assembly, wherein the nozzle bar assembly is specific to a predetermined style of pan, and wherein the nozzle bar assembly further includes:
    a) a plurality of lubricant passages in fluid communication with the plurality of lubricant passages in the valve bar assembly;
    b) a plurality of air passages in communication with the a plurality of air passages in the valve bar assembly;
    c) a plurality of chambers, wherein each chamber in the plurality of chambers is in communication with a corresponding lubricant passage in the nozzle bar assembly and a corresponding air passage in the nozzle bar assembly, and wherein a predetermined volume of lubricant is deposited in each chamber through the lubricant passage; and
    d) a spray nozzle in communication with each chamber, wherein the pressurized air propels the lubricant from the spray nozzle in the form of droplets; and
  (iii) a seal disposed between the valve bar assembly and the nozzle bar assembly; and
(d) an enclosure for housing the spray nozzle assembly, wherein the enclosure includes a lid which may be opened and closed, and wherein an air manifold assembly mounted within the enclosure;
(e) a controller for providing operational commands to the spray nozzle assembly; and
(f) a supportive frame on which the source of lubricant, source of pressurized air, and controller are mounted.

19. The system of claim 18, wherein the supportive frame further includes a gantry arm on which the spray nozzle assembly and enclosure are mounted.

20. The system of claim 18, wherein the plurality of proportional solenoid valves includes up to 40 individual solenoid valves, and wherein each solenoid valve in the plurality of proportional solenoid valves is adjustable, removable, and replaceable independent of the other solenoid valves.

* * * * *

UNITED STATES PATENT AND TRADEMARK OFFICE
CERTIFICATE OF CORRECTION

PATENT NO. : 12,232,499 B2
APPLICATION NO. : 17/862743
DATED : February 25, 2025
INVENTOR(S) : Philip Deschner It is certified that error appears in the above-identified patent and that said Letters Patent is hereby corrected as shown below:

In the Specification

Column 7, Line 56, "greater" should be --greaser--.

Column 7, Line 57, "greater" should be --greaser--.

Column 7, Line 58, "greater" should be --greaser--.

Column 7, Line 59, "greater" should be --greaser--.

Column 7, Line 60, "greater" should be --greaser--.

Column 7, Line 62, "greater" should be --greaser--.

Column 8, Line 21, "greater" should be --greaser--.

In the Claims

Column 12, Claim 10, Line 2, after "to" insert --40--.

Signed and Sealed this
First Day of April, 2025

Coke Morgan Stewart
*Acting Director of the United States Patent and Trademark Office*